US010859716B2

(12) United States Patent
Newman

(10) Patent No.: US 10,859,716 B2
(45) Date of Patent: Dec. 8, 2020

(54) ONE-DIMENSIONAL DIRECTIONAL SHIELDLESS PARTICLE DETECTOR

(71) Applicant: David Edward Newman, Poway, CA (US)

(72) Inventor: David Edward Newman, Poway, CA (US)

( * ) Notice: Subject to any disclaimer, the term of this patent is extended or adjusted under 35 U.S.C. 154(b) by 0 days.

(21) Appl. No.: 16/568,404

(22) Filed: Sep. 12, 2019

(65) Prior Publication Data
US 2020/0142081 A1    May 7, 2020

Related U.S. Application Data

(63) Continuation of application No. 16/147,734, filed on Sep. 29, 2018, now Pat. No. 10,416,322.

(60) Provisional application No. 62/626,115, filed on Feb. 4, 2018, provisional application No. 62/661,072, filed on Apr. 22, 2018, provisional application No. 62/726,295, filed on Sep. 2, 2018, provisional application No. 62/738,645, filed on Sep. 28, 2018.

(51) Int. Cl.
| | |
|---|---|
| *G01T 1/208* | (2006.01) |
| *G01V 5/00* | (2006.01) |
| *G01T 1/20* | (2006.01) |
| *G01T 1/29* | (2006.01) |
| *G01T 3/06* | (2006.01) |

(52) U.S. Cl.
CPC ............ *G01T 1/208* (2013.01); *G01T 1/20* (2013.01); *G01T 1/29* (2013.01); *G01T 3/06* (2013.01); *G01V 5/00* (2013.01)

(58) Field of Classification Search
CPC .................................................. G01T 1/2907
See application file for complete search history.

(56) References Cited

U.S. PATENT DOCUMENTS

| | | |
|---|---|---|
| 3,047,721 A | 9/1959 | Folsom |
| 3,581,090 A | 5/1971 | Brown |
| 4,037,105 A | 7/1977 | Laurer |
| 5,354,084 A | 9/1994 | Byrd |
| 5,665,970 A | 9/1997 | Kronenberg |
| 5,880,469 A | 3/1999 | Miller |
| 6,392,236 B1 | 5/2002 | Maekawa |
| 6,433,335 B1 | 8/2002 | Kronenberg |
| 6,566,657 B2 | 5/2003 | Odom |
| 6,639,210 B2 | 10/2003 | Odom |
| 7,521,686 B2 | 4/2009 | Stuenkel |
| 7,655,912 B2 | 2/2010 | Shirakawa |
| 7,745,800 B1 | 6/2010 | McGinnis |

(Continued)

*Primary Examiner* — Yara B Green

(57) ABSTRACT

A device for determining the location of a source of radiation, based on data acquired at a single orientation of the device without iteration or rotations. Embodiments may comprise two side detector panels positioned closely parallel to each other and adjacent to each other, plus a front detector positioned orthogonally in front of the side detectors, without collimators or shields. The various detectors have contrasting angular sensitivities, so that a predetermined angular correlation function can determine the sign and magnitude of the source angle according to the detection rates of the front and side detectors. Embodiments enable rapid detection and localization of nuclear and radiological weapon materials for greatly improved inspection of cargo containers and personnel. Advanced detectors such as those disclosed herein will be needed in the coming decades to protect against clandestine weapon transport.

20 Claims, 19 Drawing Sheets

(56) References Cited

U.S. PATENT DOCUMENTS

| | | |
|---|---|---|
| 7,952,079 B2 | 5/2011 | Neustadter |
| 7,994,482 B2 | 8/2011 | Frank |
| 8,030,617 B2 | 10/2011 | Enghardt |
| 8,067,742 B2 | 11/2011 | Winso |
| 8,198,600 B2 | 6/2012 | Neustadter |
| 8,247,776 B2 | 8/2012 | Peng |
| 8,319,188 B2 | 11/2012 | Ramsden |
| 8,866,100 B1 | 10/2014 | Marleau |
| 8,930,165 B2 | 1/2015 | Vilim |
| 9,012,855 B2 | 4/2015 | Speller |
| 9,158,012 B2 | 10/2015 | Willis |
| 9,529,096 B2 | 12/2016 | Yamashita |
| 9,575,189 B2 | 2/2017 | Groves |
| 9,864,074 B1 | 1/2018 | Newman |
| 2003/0165211 A1 | 7/2003 | Grodzins |
| 2005/0121618 A1 | 6/2005 | Fowler |
| 2008/0048123 A1 | 2/2008 | Larsson |
| 2009/0166549 A1 | 7/2009 | Czirr |
| 2010/0006769 A1 | 1/2010 | Kraft |
| 2011/0303854 A1 | 12/2011 | DeVito |
| 2012/0132814 A1 | 5/2012 | Weinberg |
| 2013/0256538 A1 | 10/2013 | Vogtmeier |
| 2014/0374606 A1 | 12/2014 | Gendotti |
| 2017/0261623 A1 | 9/2017 | Florido |

ONE-DIMENSIONAL DIRECTIONAL SHIELDLESS PARTICLE DETECTOR

CROSS REFERENCE TO RELATED APPLICATIONS

This application is a continuation of U.S. patent application Ser. No. 16/147,734 filed on Sep. 29, 2018, which claims the benefit of U.S. Provisional Patent Application No. 62/626,115 filed on Feb. 4, 2018, and U.S. Provisional Patent Application No. 62/661,072 filed on Apr. 22, 2018, and U.S. Provisional Patent Application No. 62/726,295 filed on Sep. 2, 2018, and U.S. Provisional Patent Application No. 62/738,645 filed on Sep. 28, 2018, the entire disclosures of which are incorporated by reference as part of the specification of this application.

FIELD OF THE INVENTION

The present invention relates generally to nuclear weapon detection. More particularly, the present invention is directed in one exemplary aspect to a radiation detector that determines the direction of a radiation source in one dimension.

BACKGROUND

The easiest way to attack a country with a nuclear weapon is by shipping the weapon to the target nation as cargo. A rogue state or terrorist organization that manages to acquire a nuclear weapon could pack it into a maritime cargo container, railcar, truck, or even a large van. Once inside the target nation, the adversary could sequester the weapon in an urban environment, a government center, or adjacent to a military base for unlimited extortion or a devastating attack at any moment.

Nuclear weapons are hard to detect. They are radioactive but not highly so, and standard shielding can reduce the radiation signature further. The primary signature of a nuclear weapon is MeV-range neutrons and gamma rays, along with low-energy neutrons moderated by surrounding materials. The main inspection challenge is to detect these particles in the presence of natural backgrounds and benign radioactive substances that are commonly present in cargo and in the environment.

A major advantage would be a gamma ray or neutron detector that indicates where the radiation is coming from. The directional information would greatly enhance the statistical power of each detection, since a small number of particles all coming from a specific location would trigger a secondary inspection immediately.

What is needed, then, is an efficient detector of gamma rays or neutrons or both, with high sensitivity in the energy ranges expected for clandestine weapons, and capable of determining the location of the source, rapidly and without searching or iteration. Such a detector should have sufficient sensitivity to localize even a well-shielded nuclear weapon among clutter and obfuscation, automatically, and at low cost. Such a detector would greatly enhance security against clandestine nuclear and radiological weapons, and would also speed up legitimate border traffic by passing clean loads quickly. And, when a secondary inspection is triggered, the inspectors could use the indicated source location as a starting point.

SUMMARY OF THE INVENTION

Disclosed herein is a device for detecting and locating of a radioactive source. In one embodiment, the device includes two side detectors, each side detector comprising a slab configured to emit a signal upon detecting an energetic electron or ion, wherein the two side detectors are positioned parallel to and adjacent to an aiming plane that extends from the back to the front of the device, a front detector comprising a slab configured to emit a signal upon detecting an energetic electron or ion, wherein the front detector has a width-to-thickness ratio of at least 4, is oriented perpendicular to the aiming plane, and is positioned frontward of the side detectors, and a processor comprising digital electronics configured to be communicatively coupled to the side detectors and the front detector, wherein the processor is further configured to determine, at least in part based on signals associated with the side detectors, the sign of the angle between the aiming plane and the radioactive source, and to determine the magnitude of the angle between the aiming plane and the radioactive source by performing a method that includes measuring particle detection rates in the front detector and in the side detectors respectively, subtracting the detection rate of one of the side detectors from the detection rate of the other side detector, thereby obtaining a differential, dividing the differential by the detection rate of the front detector, thereby obtaining a ratio, and comparing the ratio to a predetermined angular correlation function that relates particle directions to particle detection data.

These and other embodiments are described in further detail with reference to the figures and accompanying detailed description as provided below.

DETAILED DESCRIPTION OF INVENTION

Figure 1:
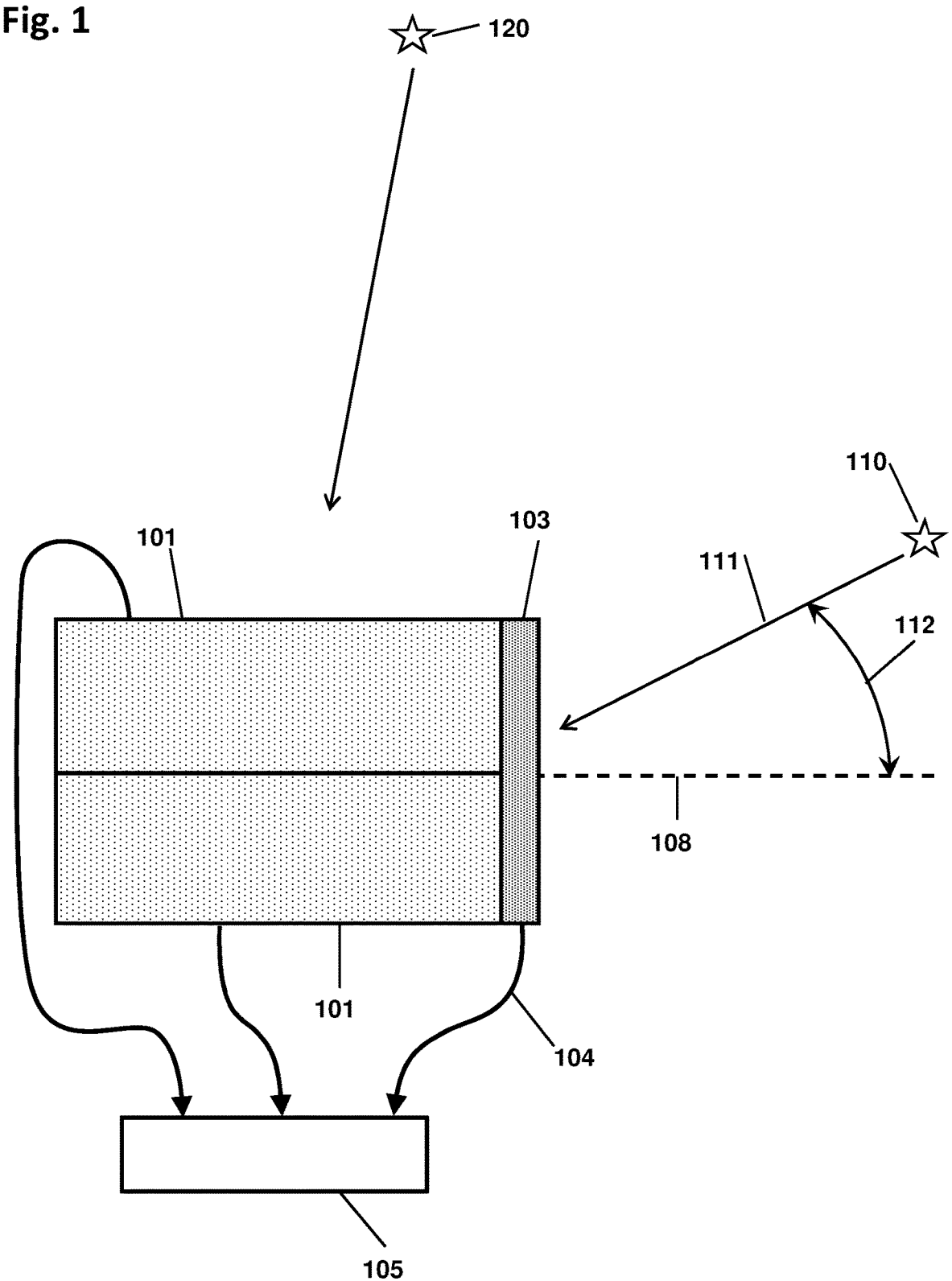
FIG. 1 is a top-view sketch in cross-section of an exemplary device according to the disclosure comprising two side detectors, an orthogonal front detector, and a processor according to some embodiments.

In the following description, reference is made to the accompanying drawings in which it is shown by way of illustration specific embodiments in which the invention can be practiced. Not all of the described components are necessarily drawn to scale in order to emphasize certain features and to better facilitate the reader's conception of the disclosed embodiments. It is to be understood that other embodiments can be used and structural changes can be made without departing from the scope of the embodiments of disclosed herein.

Disclosed herein is a directional radiation detector device (the "device") for localizing clandestine nuclear weapons and any other radioactive source or sources to be localized (the "source"). In some embodiments, the device may be configured to detect gamma rays or neutrons or both (the "particles") from the source, and may indicate the angle of the source relative to the device, including the sign and magnitude of the angle (the "source angle"), thereby locating the source in one dimension such as the horizontal dimension. Embodiments of the device can determine the source angle from detection data acquired at a single orientation of the device, with high detection efficiency and superior angular resolution. For security against clandestine radioactive threats, the ability to detect and localize a source rapidly is an enabling improvement.

In some embodiments, the device may comprise two parallel slab-shaped detectors (the "side detectors"), with a third slab-shaped detector (the "front detector") positioned orthogonally in front of the device, and an electronic processor, with no shield or collimator. The processor may be configured to analyze the particle detections and determine the source angle, including the sign and magnitude of the angle of the source relative to the device. The side detectors may be positioned parallel to and adjacent to an "aiming plane" comprising a plane extending from the back to the front of the device. The side detectors may be adjacent to each other, or substantially in contact with each other aside from intervening wrappings and the like. The "midplane" is a plane passing through the center of the device, and orthogonal to the aiming plane, and orthogonal to the front detector; thus the aiming plane, the midplane, and the front detector are all mutually perpendicular. The side detectors and the front detector (collectively "the detectors") may be substantially planar slabs configured to emit a signal upon detecting the particles, or more specifically to emit an electrical or optical pulsed signal when traversed or partially traversed by an energetic electron or ion subsequent to an interaction by a source-emitted neutron or gamma ray. For example, the detectors may comprise scintillator type detectors, or semiconductor detectors such as reverse-biased diodes, or gaseous ionization detectors such as Geiger or proportional chambers. The detector pulse may comprise a light pulse for scintillator type detectors, or a charge or current pulse for semiconductor or gaseous ionization type detectors. Each detector may include, or be connected to, a sensor comprising a transducer configured to convert the raw detector pulses into electronic signals that the processor can analyze. For example, if a detector is a scintillator, the sensor may be a light sensor such as a photomultiplier tube or a photodiode, and if the detector is a semiconductor or gaseous ionization type of detector, the sensor may be an amplifier along with other electronics.

In some embodiments, the detectors may be configured to produce distinct signals, such as signals on separate conductors or signals having different pulse shapes, so that the processor can determine which signal is associated with which detector. The processor may comprise digital electronics, and optionally analog electronics, configured to analyze signals from the detectors or their associated sensors, and thereby calculate the source angle from the signals.

The analysis may include using a predetermined angular correlation function that relates the source angle to the signals from the various detectors.

In some embodiments, the device may have one-dimensional directionality, in that it can determine one vectorial component of the source location relative to the aiming plane. The source angle may comprise the angle between the aiming plane and a vector that extends from the device to the source location. The device may determine the full sign and magnitude of the source angle from data acquired at a single device orientation, without rotating or moving the device. The device may be configured to calculate the source angle by inserting detection data, such as particle counting rates, into a formula that correlates the source angle to the detection data. The detectors may all have different angular sensitivities, and the formula may be configured to determine the source angle according to the contrasting angular sensitivities of the various detectors. In many applications, the angle of interest is the horizontal angle of the source, in which case the device may be oriented with the aiming plane vertical so as to measure the horizontal angle of the source. In other applications, the vertical angle of the source is to be determined, in which case the device may be reoriented (specifically, rolled) by 90 degrees to measure the vertical angle of the source.

In some applications, the initial determination of the source angle, sign and magnitude, is sufficient to localize the source. In other applications, the device may be required to finally aim directly at the source, in which case the device can first determine the source angle from an initial orientation, and then can be rotated according to the calculated angle, thereby pointing toward the source. Embodiments of the present device can be brought into alignment with the source in a single rotation by the calculated source angle, without searching or iteration. In addition, embodiments can directly detect when the aiming plane is aligned with the source by determining that the side detectors have nearly the same counting rate.

FIG. 1 is a cross-section sketch of an embodiment of the device including two side detectors 101 (shown in light stipple), a front detector 103 (dark stipple), and a processor 105. The device is pointing to the right in this view, and in all of the sketches unless otherwise specified. Also shown is the aiming plane 108 as a dash line, since it is viewed edge-on in this top view. The midplane is not shown because it lies in the plane of the figure. A source 110 is indicated by a star, and a particle 111 as an arrow. The source angle 112 of about 30 degrees is indicated as an arc. The side and front detectors 101 and 103 may be configured to emit signals 104 upon detecting the particles 111, and to convey those signals 104 to the processor 105, which may be configured to analyze the signals 104 and calculate the source angle 112. More specifically, the processor 105 may be configured to calculate the difference in counting rates of the side detectors 101, divide by the front detector 103 counting rate, and compare the resulting ratio to a predetermined angular correlation function, thereby determining the source angle 112. Due to the contrasting angular sensitivities of the detectors, the front detector 103 enables the source angle 112 to be determined faster and with higher precision than could be obtained from the side detectors 101 alone, particularly when the source angle 112 is near 90 degrees, according to some embodiments. Also, the front detector 103 breaks the front-back ambiguity and can indicate whether the source 110 is in front or behind the device. In this way the device can determine the specific horizontal location of the source 110, from −90 to +90 degrees, using data acquired at a single orientation of the device. For example, the device can also detect and precisely localize an alternate source 120 at a high angle of about 85 degrees, without rotations or iteration.

The side detectors 101 and the front detector 103 may be of any type suitable for the particle 111 being detected. In an exemplary embodiment, the detectors 101 and 103 may be configured to interact with the particle 111 and thereby generate secondary particles ("secondaries"), such as Compton electrons from gamma ray interactions, or recoil protons from fast neutron scattering, or reaction ions from slow neutron capture.

The side detectors 101 may have any thickness that provides sufficient radiation detection efficiency. In some embodiments, the best angular resolution may be obtained when the thickness of the side detector 101 is substantially less than its length in the front-back dimension; however, adequate detection efficiency requires that the side detector 101 be as thick as possible. Therefore, the optimal thickness of the side detectors 101 may be a compromise between angular resolution and detection efficiency. Good performance can usually be obtained with a rectangular cross-section side detector 101 of thickness in the range of 0.1 to 0.5 times the length of the side detector 101, although designers may select different side detector geometries for specific purposes. Examples of configurations with different side detector shapes are provided below.

The side detectors 101 may be sufficiently thick to block or attenuate a particular fraction (the "blocking fraction") of the particles 111 incident orthogonally on the side detector 101. In some embodiments, the side detectors 101 may be configured with a particular blocking fraction according to the expected range of source angles in the application. For example, in applications wherein the particles 111 are expected to arrive mainly from the front, a blocking fraction of 20% to 30% may be sufficient to provide distinct detections in the two side detectors 101 because most of the particles 111 arriving from the front will encounter a path-length of detector material which is tangentially longer than the thickness. If the application involves particles 111 arriving from a wider range of angles, a blocking fraction of 40% to 50% may provide sufficient contrast. If the particles 111 are expected to arrive mainly from the sides, a higher blocking fraction of 60% to 90% may be desirable. As used herein, the particle 111 is blocked by one of the side detectors 101 if no detectable radiation passes through to the other side detector 101. For example, any radiation passing through one of the side detectors 101, such as scattered or secondary particles, must total less energy than a detection criterion, so that the particle 111 would not be detected by the downstream side detector 101. The detection criterion is typically 10% of the energy of the initial particle 111.

In an exemplary embodiment, the signals 104 may comprise electrical pulses or optical pulses or other pulses according to the type of detectors 101 and 103 involved. The detectors 101 and 103 may include sensors comprising transducer means for converting one type of signal into another type, such as a photomultiplier or photodiode that converts light pulses into electrical pulses. The processor 105 may comprise digital electronics and optionally analog electronics, and may be configured to analyze the signals 104 and thereby calculate the source angle 112. For example, the processor 105 may include an amplifier or an electronic filter or a pulse-shape discriminator or other analog electronics. The processor 105 may further include a predetermined angular correlation function comprising data stored on non-transient computer-readable media and configured to relate the source angle 112 to detection data of the detectors 101 and 103. The predetermined angular correlation function may comprise any functional or tabular or analytical or graphical data set that relates the source angle 112 to the detection data. The processor 105 may also be configured to apply corrections for backgrounds and/or detector efficiencies to each detector 101 and 103 individually, preferably before the angular analysis is performed. For example, the processor 105 may be configured to reject, for the angle determination, any events in which both of the side detectors 101 produce signals simultaneously because these events are likely due to cosmic rays. On the other hand, events in which the particle 111 deposits energy in both of the side detectors 101 may be advantageous for determining the energy of the incoming particle 111, as discussed below.

The processor 105 may be embedded in the device, or mounted proximate to the detectors, or mounted externally and some distance from the detectors. There may be two separate processors, such as an embedded microcontroller in the device and a facility computer elsewhere. In some embodiments, the detectors 101 and 103 may include analog electronics such as filters and amplifiers, plus digital electronics such as an embedded microcontroller for pulse shape analysis or other tasks. In other embodiments, the processor 105 may include analog signal-processing electronics as well as digital electronics and logic. The processor 105 may further indicate the calculated source direction using a human-readable display or indicator. The processor may store the results in a non-transitory computer-readable record. The processor may transmit the results to an external computer.

In some embodiments, the front detector 103 may be wide enough to cover the side detectors 101. Alternatively, the front detector 103 may overhang or extend laterally beyond the side detectors 101, thereby obtaining a higher detection efficiency. As a further alternative, the front detector 103 may be smaller than the array of side detectors 101, thereby reducing obscuration of the side detectors 101 and thus increasing the detection efficiency of the side detectors 101. In preferred embodiments, the front detector 103 may have a width-to-thickness ratio of at least 4, where the width is measured perpendicular to the aiming plane 108, and the thickness is measured parallel to the aiming plane 108 in the front-to-back direction. In some embodiments, the width and thickness of the front detector 103 may be related to the particle interaction distance. The particle interaction distance is the average distance that the particles 111 travel in the detector material before detectably interacting. The particle interaction distance may be the inverse mass attenuation factor for gamma rays, or the average scattering distance for fast neutrons, or the projected mean free path for capture of slow neutrons. For example, the width of the front detector 103 may be a multiple, such as 2, times the particle interaction distance, while the thickness may be a fraction, such as ½, times the particle interaction distance. When so configured, the front detector 103 can provide greater detection efficiency for particles 111 arriving from the front than from the side, as desired. The width-to-thickness ratio of the front detector 103 may thereby determine the angular correlation function from which the source angle 112 is calculated.

In some embodiments, the device can determine whether the source 110 is in front or behind the detector. Since the front detector 103 is positioned frontward of the device, the front detector 103 has a higher counting rate when the source 110 is in front of the device, and a lower rate when the source 110 is behind the device. For example, the processor 105 may be configured to calculate the front detector rate divided by the sum of the two side detector rates, and may compare that result to the expected range of values for a source 110 in front versus behind the device, and thereby determine whether the source 110 is in the front or rear halfspace.

In some embodiments, the front detector 103 may partially block the incoming particles 111 from reaching the side detectors 101. The front detector 103 may be configured to pass a fraction of the incident particles 111 without interacting so that they can be detected in the side detectors 101. In general there are three main possibilities: (1) An incoming particle 111 may pass right through the front detector 103 without interacting, and then be detected in the side detector 101. (2) The incoming particle 111 may interact in the front detector 103 and be stopped or backscattered or otherwise blocked from reaching the side detector 101. (3) The particle 111 may scatter in the front detector 103 and be detected there, and then the scattered particle or its secondaries may continue in about the same direction and be counted in the side detector 101. For example, an incoming gamma ray can Compton scatter in the front detector 103, and then the scattered gamma ray can be detected in whichever side detector 101 that it was headed toward. Thus one of the side detectors 101 and the front detector 103 are triggered at about the same time, in which case the processor 105 may be configured to count both the front and side detector 103 and 101 signals as valid events. For example, the front detector 103 may be thick enough so that 50% of the incoming particles pass through the front detector 103 without interacting, 25% scatter and are detected in the front detector 103 and then continue on to be detected again in the side detectors 101, and the remaining 25% are detected in the front detector 103 and are absorbed there. Thus the side detectors 101 can detect 75% of the particles while the front detector 103 can detect 50% of the incoming particles. This adds up to more than 100% because the events with detections in both the front 103 and side 101 detectors are counted twice.

In the case of neutrons, a fast neutron may pass through the front detector 103 without interacting and then be detected in the side detector 101; or the neutron could scatter in the front detector 103 and then continue on to be detected in the side detector 101; or it could scatter out of the front detector 103 and miss the side detectors 101 entirely. Thus a fast neutron could trigger the front detector 103, or the side detector 101, or both the front and side detectors 103 and 101 at once. Again, events with a pulse in the front and side detectors 103 and 101 may be counted as valid events.

Slow or low-energy neutrons are generally detected by neutron capture reactions which do not produce a scattered or secondary neutron. The ions emitted from a neutron capture reaction have extremely short path lengths in matter. Therefore, slow neutron events cannot produce valid counts in both the front detector 103 and the side detector 101 at the same time. To compensate, embodiments for slow neutron detection may be configured with a thinner front detector 103, such as a front detector configured to capture only 33% of the incident slow neutrons, and thereby allow additional slow neutrons to pass through to the side detectors 101.

In some embodiments, the processor 105 may be configured to reject events in which both of the side detectors 101 are active at the same time, since these are usually due to cosmic rays or to particles 111 that scatter from one of the side detectors 101 and into the other side detector 101. The processor may also reject events in which the detection pulse height is too large since these are likely due to cosmic rays arriving vertically and passing through an extended region of the detector, resulting in large pulses. For example, a scintillator may have a vertical dimension of typically 5 to 15 cm for a small device. Depending on the cosmic ray angle, the cosmic ray may deposit energy throughout a substantial pathlength of scintillator, at least 3 cm typically for a 1 cm thick detector. Fast muons drop about 2 MeV per gram/cm$^2$ of material traversed, or at least 6 MeV in 3 cm of plastic scintillator. Most of the gammas from nuclear weapon materials are much lower in energy, typically 1-2 MeV. Therefore, even with the relatively poor energy resolution of plastic scintillators, most of the cosmic rays can be rejected by a threshold cut at 3 to 4 MeV.

The side and front detectors 101 and 103 may be selected according to the type of particle 111. To detect gamma rays, for example, the side detectors 101 may comprise low-cost plastic scintillator material, while the front detector 103, being much thinner, may be made from a high-density scintillator such as CdWO$_4$ or BGO, according to some embodiments. Although inorganic scintillators often cost more than plastic, the higher detection efficiency of the denser material may partially compensate for the small volume of the front detector 103, resulting in faster localization of sources.

For detecting fast neutrons, the detectors 101 and 103 may comprise plastic scintillators, but preferably with a fluor that discriminates recoil proton tracks from electron tracks, so as to reject gamma ray backgrounds. Alternatively, the side detectors may comprise a hydrogenous transparent material such as acrylic, with ZnS and preferably a wavelength shifter to assist in light collection. As another option, the front and side detectors 103 and 101 may comprise an elpasolite or other ionization-dependent scintillator, configured to emit different pulses according to the ionization density of the charged-particle secondaries, and thereby discriminate between gamma rays and neutrons.

For detecting slow (thermal or epithermal) neutrons, the front and side detectors 103 and 101 may comprise a hydrogenous material such as borated PVT, or a ZnS-based transparent material loaded with boron or lithium to capture the neutrons. Alternatively, the detectors 101 and 103 may comprise a transparent hydrogenous matrix such as PMMA (polymethylmethacrylate) loaded with microbeads of scintillator that contain, or are proximate to, a capture nuclide such as Li or B (preferably enriched in $^{10}$B or $^6$Li). The microbeads may be sized according to the range of the emitted ions, which is typically a few microns to a few tens of microns, so that the kinetic energy of the ions will be efficiently collected in each scintillator microbead. The microbeads may be spaced apart by one to a few millimeters so that Compton electrons will usually pass through at most one of the microbeads, producing a negligible light pulse. In this way the composite microbead scintillator can efficiently detect low energy neutrons while being nearly blind to gamma rays.

As an exemplary embodiment for detection of 1 MeV gamma rays, the side detectors 101 may comprise PVT plastic with a thickness of 25 mm and length of 80 mm. "Length" refers to the size of the side detectors 101 in a direction going from the back to front of the device. The "height" is measured in the third dimension, perpendicular to the midplane. The height of the side detectors 101 is arbitrary, but 5 to 20 cm may be a suitable choice for a portable unit. For a fixed-site vehicle scanner, the height may be much larger, up to four meters assuming the signals can be collected efficiently throughout the detector 101. Such a tall detector can scan the entire vehicle or inspection zone at once. The front detector 103 may be a CdWO$_4$ scintillator with dimensions 6 mm thick by 70 mm wide, and oriented perpendicular to the side detectors 101 as shown in the sketch.

In some embodiments, the side detectors 101 may comprise spectroscopic type scintillation or semiconductor detectors in which the signal amplitude or integral charge is proportional to the amount of energy deposited by the incident particle. Preferably the energy uncertainty is at most 10%, wherein the energy uncertainty is the full-width-at-half-maximum of the full-energy peak divided by the particle energy. The energy data may identify the source composition, and may also enable source particles 111 to be distinguished from background radiation.

In some embodiments, the processor 105 may be configured to calculate the source angle 112 according to the different and contrasting angular sensitivity distributions of the various detectors 101 and 103. The angular sensitivity of a detector is the detection rate as a function of the source angle 112. The angular sensitivity of the front detector 103 may be determined by the shape and perpendicular orientation of the front detector 103, whereas the angular sensitivities of the side detectors 101 may be determined by the blocking fraction of the other side detector 101. Each side detector 101 may thus have a strongly antisymmetric angular sensitivity, while the front detector 103 may have a symmetrical angular sensitivity, relative to the aiming plane 108. Exploiting that difference, a unique angular correlation function can be prepared, relating the source angle 112 to the detection rates. Each source angle 112 may correspond to a unique ratio of counting rates in the detectors, and therefore the source angle 112 can be determined from an appropriate analysis of the detection rates at a single orientation, without the need for iteration or rotations. In this way the device can greatly speed up the source detection and localization process by determining the sign and magnitude of the source angle 112 simultaneously and automatically, at any orientation of the device.

Figure 2:
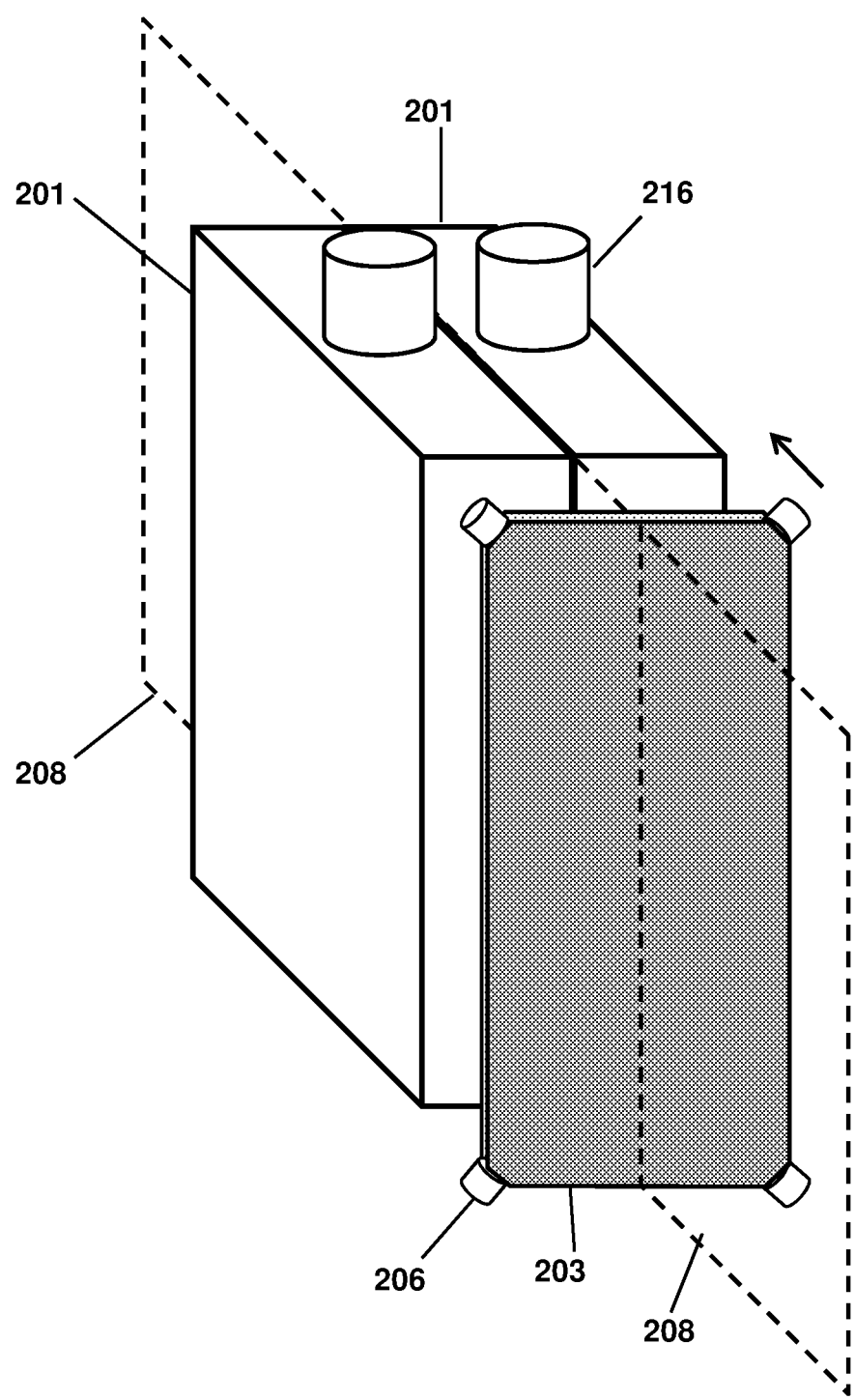
FIG. 2 is a perspective sketch, partially exploded, of the device of FIG. 1, pointing toward the viewer, according to some embodiments.

FIG. 2 is a perspective sketch, partially exploded, of the embodiment of FIG. 1. The device is pointing toward the viewer's right side and out of the page. The device may include two side detectors 201 adjacent to each other, and oriented parallel to each other and to the aiming plane 208, and a front detector 203 positioned orthogonally across the front of the device and perpendicular to the side detectors 201 and perpendicular to the aiming plane 208. The aiming plane 208, shown in dash, is the plane of symmetry of the device, passing through the center of the device. In one embodiment, four small sensors 206, such as photodiodes or amplifiers, may be mounted on the corners of the front detector 203. Additional sensors 216, such as phototubes, may be coupled to the side detectors 201 respectively.

Figure 3:
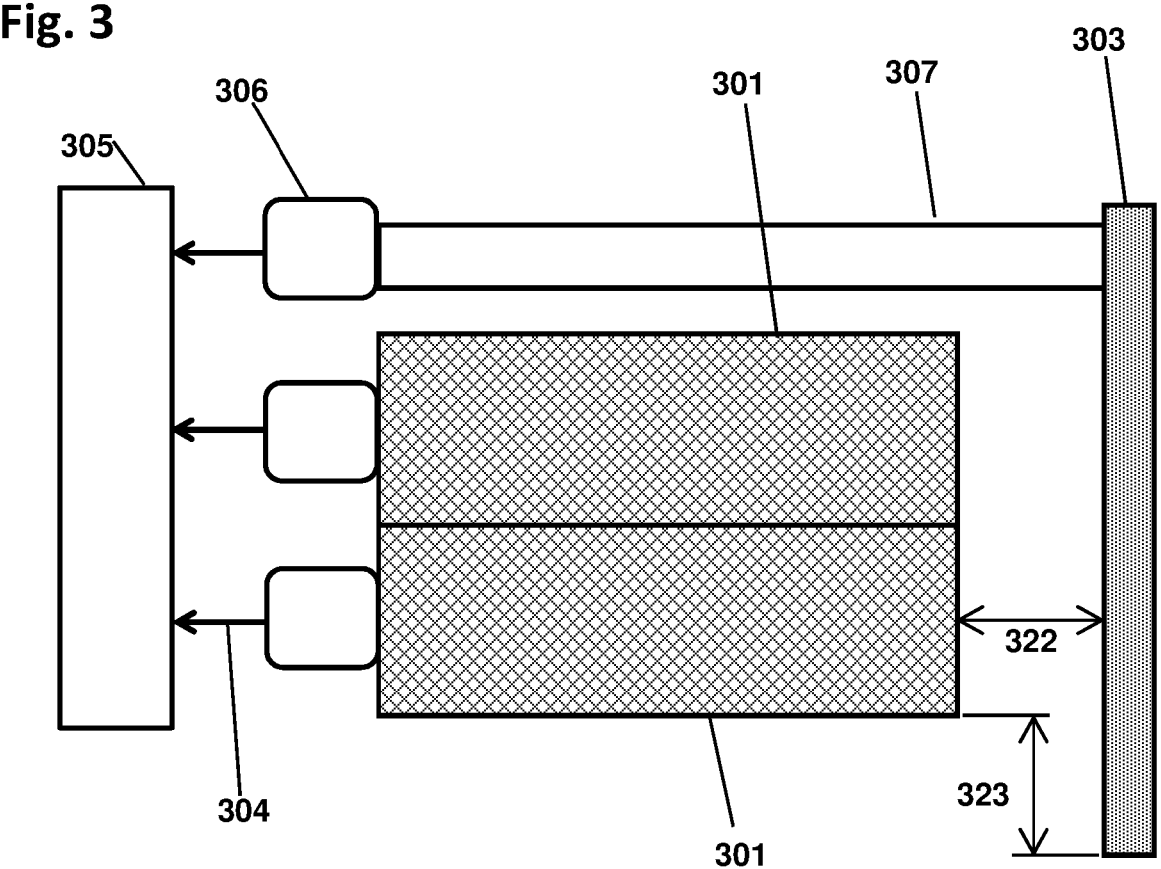
FIG. 3 is a cross-section sketch of an exemplary device, including front detector overhang, according to some embodiments.

FIG. 3 is a cross-section view of an exemplary embodiment of the device, with improvements. In the sketch, two side detectors 301 are closely parallel to each other, with the front detector 303 orthogonally in front of the device. The detectors 301 and 303 are scintillators in this case. The side detectors 301, shown here in cross-hatch, may comprise energy-resolving detectors configured to measure the amount of energy deposited therein by particle interactions and their secondaries. Preferably the energy uncertainty of each side detector 301 is at most 10%, where the energy uncertainty is the ratio of the full width at half-maximum of the full energy peak, divided by the energy of the full energy peak. Scintillators such as NaI and semiconductor detectors can provide energy uncertainty of less than 10%.

Light sensors 306 view the side detectors 301 and a light guide 307, which is coupled to the front detector 303.

Signals 304 are passed to a processor 305 for analysis. Each detector 301 and 303 may be viewed by a different light sensor 306, thereby assuring that the signals 304 from each detector 301 or 303 are distinct and that each particle event can be correctly associated with the detector 301 or 303 in which the interaction occurred. Although the light sensors 306 are shown at the back surfaces of the device, in an alternative embodiment the light sensors 306 may be positioned on the top or bottom surfaces of the various detectors 301 and 303 for improved light collection. In some embodiments, the processor 305 may be configured to add the signals 304 of each of the side detectors 301, or alternatively to sum the energies detected by each of the side detectors 301, and thereby determine the energy of the incident particle, including any energy that passes from one of the side detectors 301 to the other side detector 301. As a further option, the processor 305 may be further configured to sum the energies of the side detectors 301 only when both side detectors 301 register a significant amount of energy. For example, the processor 305 can accept, for spectroscopic analysis, only those events in which the signals of both side detectors 301 exceed a predetermined threshold such as an energy of 100 keV or higher. The requirement that both side detectors 301 have a significant amount of energy deposited therein reduces the likelihood that some of the particle energy has escaped from the device, and may thereby improve the total energy resolution obtainable.

The front detector 303 is shown spaced forward relative to the side detectors 301 by a gap distance 322. The front detector 303 is also shown laterally wider than the rest of the detector, or more specifically extending laterally beyond the side detectors 301 by an overhang distance 323. The overhang 323 may result in larger area and therefore higher detection rates in the front detector 303, and may also improve the angular sensitivity of the front detector 303. The light sensors 306 may be small (25 mm) photomultiplier tubes or photodiode light sensors or other transducers that provide a fast, low-noise, high-sensitivity electrical pulse for each light pulse. The light sensors 306 may further include signal processing electronics such as amplifiers, filters, discriminators and the like.

In some embodiments, the side detectors 301 and front detector 303 may have strongly contrasting angular sensitivity distributions. Each side detector 301 may determine the angular response of the other side detector 301 by partially blocking the particles from one side. Consequently the two side detectors 301 may have strongly antisymmetric angular sensitivity distributions which are opposite to each other. The front detector 303, on the other hand, may be symmetrically positioned, and therefore may have a symmetric angular sensitivity pattern. The angular correlation function may exploit the difference between the symmetric and antisymmetric angular sensitivity patterns of the side detectors 301 and the front detector 303, thereby enabling a precise determination of the source angle from a single orientation of the device.

In some embodiments, the sign of the source angle may be related to the sign of the difference between the counting rates of the two side detectors 301. For example, the sign of the source angle may be equal to the sign of the differential, or else the sign of the source angle may be opposite to sign of the differential, depending on which side detector 301 is subtracted from the other. The magnitude of the source angle may be related monotonically to the ratio of the differential divided by the front detector 303 counting rate, for example being related by a predetermined angular correlation function. Together, the sign and magnitude determine the full source angle uniquely, in one dimension, relative to the aiming plane.

Operationally, at the beginning of a scan, the device can start out at some initial orientation which may be in the center of an inspection zone, or at the center of the range of rotation of the device, or centered on a suspicious item, or otherwise pre-planned, or random. The device can then acquire particle detection rate data from all the detectors 301 and 303 at that initial orientation, and can then calculate the implied source angle using a predetermined angular correlation function. The angular correlation function may be stored on computer-readable media and may be read by the processor 305; alternatively the angular correlation function may be stored within the processor 305 such as the internal ROM of a microcontroller. The angular correlation function may comprise discrete values such as a table, each value being the source angle that corresponds to each ratio value, or vice-versa. The discrete values of the angular correlation table may be linearly interpolated whenever an intermediate value is needed between the table entries. Alternatively, the angular correlation information may be stored as a mathematical function or a computer program or other algorithm that takes as input the detector data, and produces as output the best-fit source angle, in which case interpolation may not be necessary. The ability of the device to calculate both the sign and magnitude of the source angle, from data acquired at a single orientation, is extremely valuable. With knowledge of the full angle toward the source, the device can provide much better localization results and faster convergence than possible with a simple left-or-right indication.

Figure 4:
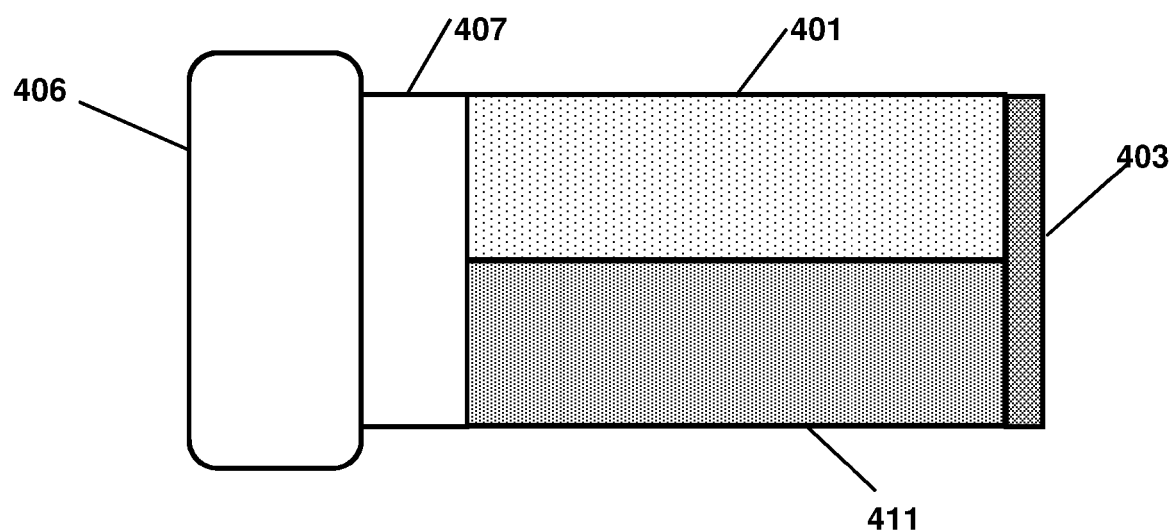
FIG. 4 is a cross-section sketch of an exemplary device with three scintillators of different types, all coupled to a common light sensor, according to some embodiments.

FIG. 4 is a cross-section sketch of an exemplary embodiment of the device in which the two side detectors 401 and 411 comprise two different scintillator materials emitting detectably different light pulse shapes while a light sensor 406 views both of the side detectors 401. For detecting gamma rays, the first side detector 401 may be PVT and the other side detector 411 may be BGO, which have pulse decay times of 5 ns and 300 ns respectively. The front detector 403 may comprise yet a third material with a distinct pulse shape, such as $CdWO_4$ with decay times of about 1 and 14 microseconds. In addition, the front detector 403 may be optically coupled to the two side detectors 401 and 411, which may be optically coupled to a light guide 407, which may be coupled to a light sensor 406. Alternatively, the light sensor 406 may be coupled to the top or bottom surfaces of the detectors 401, 411, and 403, with or without an intervening light guide 407, in which case it may not be necessary to optically couple the front detector 403 to the side detectors 401 and 411. In either case, the detectors 401, 403, and 411, may all be viewed by the same light sensor 406. The device can separate the various pulses according to their distinct shape for each scintillator type, and thereby determine which detector 401, 411, or 403 detected the particle. The depicted configuration may be economical since only one light sensor 406 may be needed.

Figure 5:
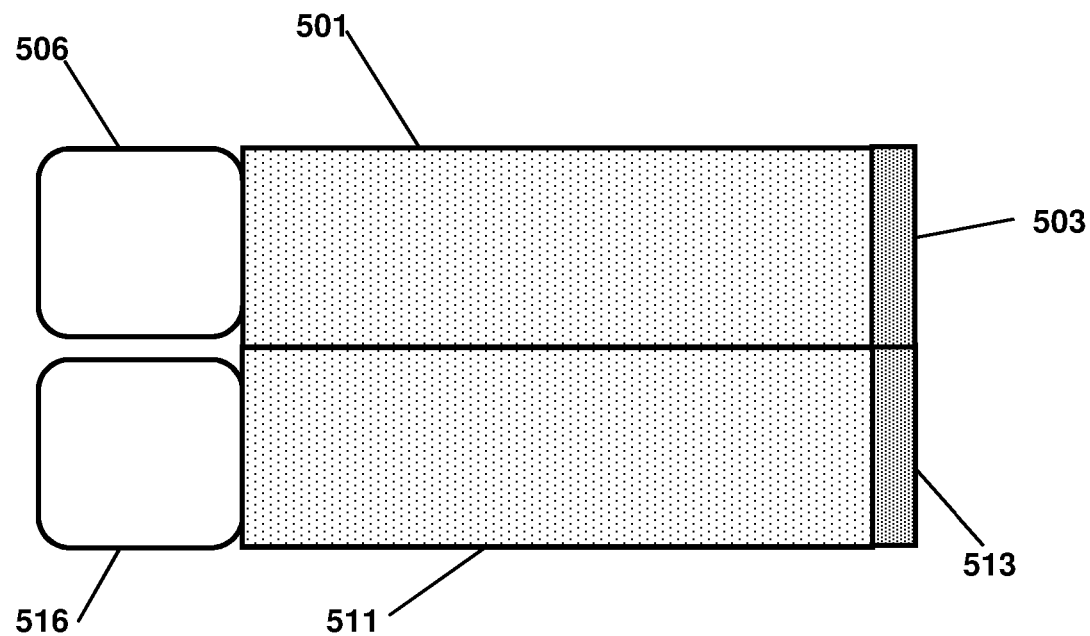
FIG. 5 is a cross-section sketch of an exemplary device with separate left-front and right-front detectors which are optically coupled to the side detectors, according to some embodiments.

FIG. 5 is an exemplary embodiment with two side detectors 501 and 511, and the front detector is divided into two separate portions comprising the left front portion 503 and the right front portion 513, each portion being oriented perpendicular to the back-to-front direction and perpendicular to the aiming plane and positioned frontward of the side detectors 501 and 511. The left front portion 503 and right front portion 513 may abut at the aiming plane. The counting rates of the two portions 503 and 513 may be added together, thereby determining a total front detection rate, and the source angle may be determined according to the ratio of the side detector differential divided by the total front detection rate. Thus the sum of the left and right front portions 503 and 513 may act as a single unsplit front detector for determining the source angle.

In some embodiments, the front detector portions 503 and 513 may be read out by separate sensors, and the side detectors 501 and 511 may be read out by other sensors, thereby providing separate signals for each of the detectors. In other embodiments, the front detector portions 503 and 513 may be optically coupled to their respective side detectors 501 and 511 as shown, and read out by shared sensors 506 and 516. More specifically, the left front portion 503 may be optically coupled to the left side detector 501, both of which are then viewed by one of the light sensors 506, and likewise the right front portion 513 may be optically coupled to the right side detector 511 and viewed by the other light sensor 516. Alternatively, each light sensor 506 and 516 may be mounted on the top or bottom surfaces of the respective side and front detectors (501 and 503, or 511 and 513) with or without a light guide. Preferably the left front portion 503 and the left side detector 501 produce detectably different signals, and the right front portion 503 and the right side detector 501 produce detectably different signals. Herein, two signals are "detectably different" if they can be ascribed to whichever detector interacted with the particle, and thus can be separated in analysis. Such a configuration may be economical since it requires only two sensors 506 and 516.

Figure 6:
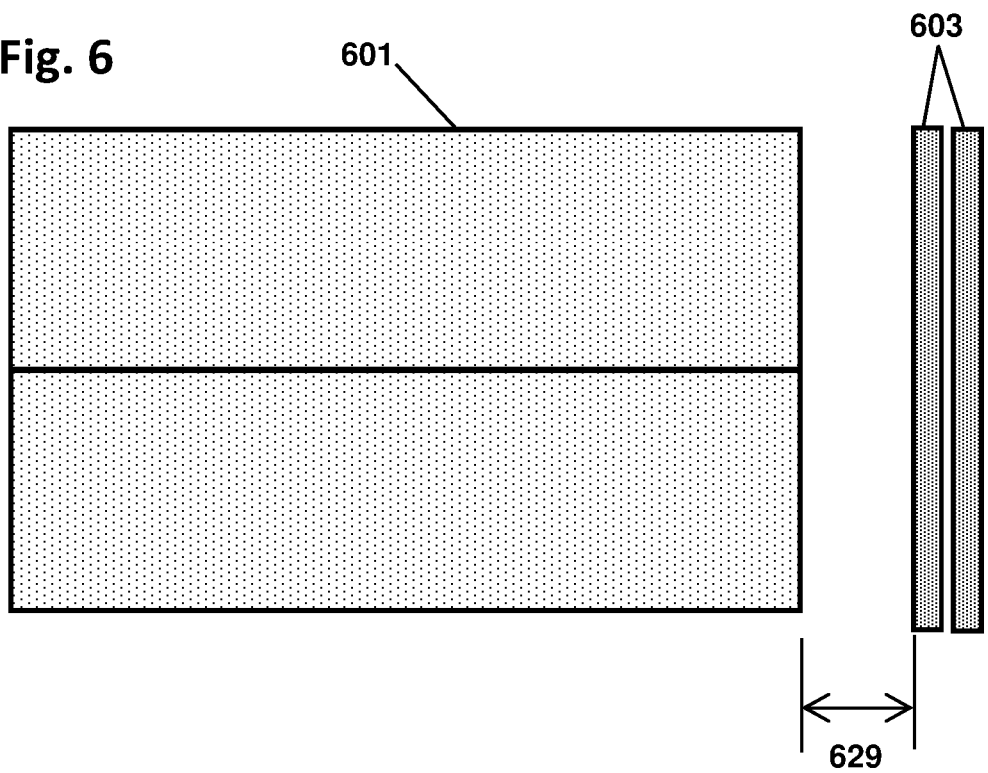
FIG. 6 is a cross-section sketch of an exemplary device with two stacked front detectors, according to some embodiments.

FIG. 6 is a cross-section sketch of an exemplary configuration of the device with two front detectors 603, mounted proximate to each other and parallel to each other in a stack configuration. The front detectors 603 are mounted in front of the device and frontward of the side detectors 601 and orthogonal to the side detectors 601 and orthogonal to the aiming plane. The two front detectors 603 are both configured to detect the particles. Thus they double, or nearly double, the detection efficiency while maintaining a very high width-to-thickness ratio for each of the front detectors 603, which results in improved angular resolution. The two front detectors 603 are shown spaced from the front of the side detectors 601 by a gap distance 629. The position of the front detectors 603 may be configured so as to tailor the shape of the angular correlation function for example, or to reduce how much of the side detectors 601 are blocked by the front detectors 603 for particles arriving from certain angles. The gap distance 629 may have any value; for example, the gap distance 629 may be substantially equal to the thickness of the side detectors 601.

In another embodiment, the side detectors 601 and the front detectors 603 may all be dual-mode detectors configured to detect both gammas and neutrons while discriminating between them according to pulse shape. For example, the front and side detectors 601 and 603, may all comprise elpasolite scintillator. Such detectors can detect and localize a gamma ray source, and can simultaneously detect and localize a neutron source, according to the signal pulse shapes.

Figure 7:
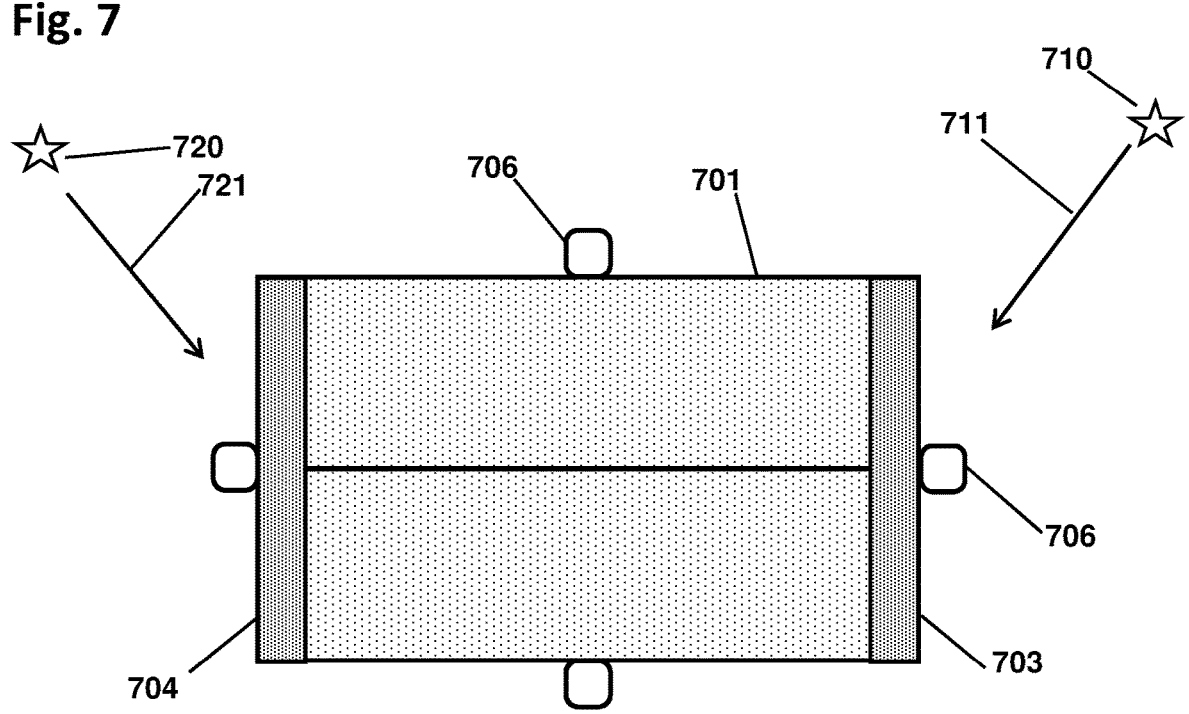
FIG. 7 is a cross-section sketch of an exemplary device including a front detector and a back detector, configured to measure radiation from all sides at once, according to some embodiments.

FIG. 7 is a top-view cross-section sketch of an exemplary embodiment of the device in a double-sided configuration. The front of the device is at the right of the sketch, and the back of the device is at the left, although the embodiment is symmetric and there is no substantial difference between front and back. Two side detectors 701, a front detector 703, and a back detector 704 are shown with sensors 706 mounted on the outer faces of the various detectors. Small sensors 706 such as photodiodes may be used, thereby minimizing the blocking of incoming particles. Alternatively, the sensors 706 may be mounted on the top or bottom surfaces of the detectors 701, 703, and 704. The back detector 704 may be substantially similar to the front detector 703 in shape and composition, but mounted on the back surface of the device rearward of the side detectors 701 and parallel to the front detector 703. Both the front and back detectors 703 and 704 are perpendicular to the side detectors 701. By comparing the detection rates of the front and back detectors 703 and 704, the device can determine the position of the source in front or behind the device.

The sketch shows one source 710 in front of the device emitting a particle 711 toward the front detector 703, and an alternative source 720 emitting a second particle 721 toward the back detector 704. The device can determine whether a source is in front or behind the device by comparing counting rates in the front and back detectors 703 and 704. The device can then determine the source angle by subtracting data associated with one of the side detectors 701 from the other side detector 701 data, thereby obtaining a differential, and then dividing the differential by data from whichever of the front and back detectors 703 or 704 has the higher counting rate, thereby obtaining a ratio, and then comparing the ratio to a predetermined angular correlation function to determine the source angle. As a practical matter, the angular correlation functions of the front and back scintillators 703 and 704 might be somewhat different due to variations in material properties or fabrication. Therefore, a separate angular correlation function may be measured experimentally and employed for each of the front and back detectors 703 and 704. The double-sided configuration as depicted may be useful when an unknown source could be located anywhere around the device, since the device provides a 360-degree view and high detection efficiency, and thus can detect particles from any direction.

Figure 8:
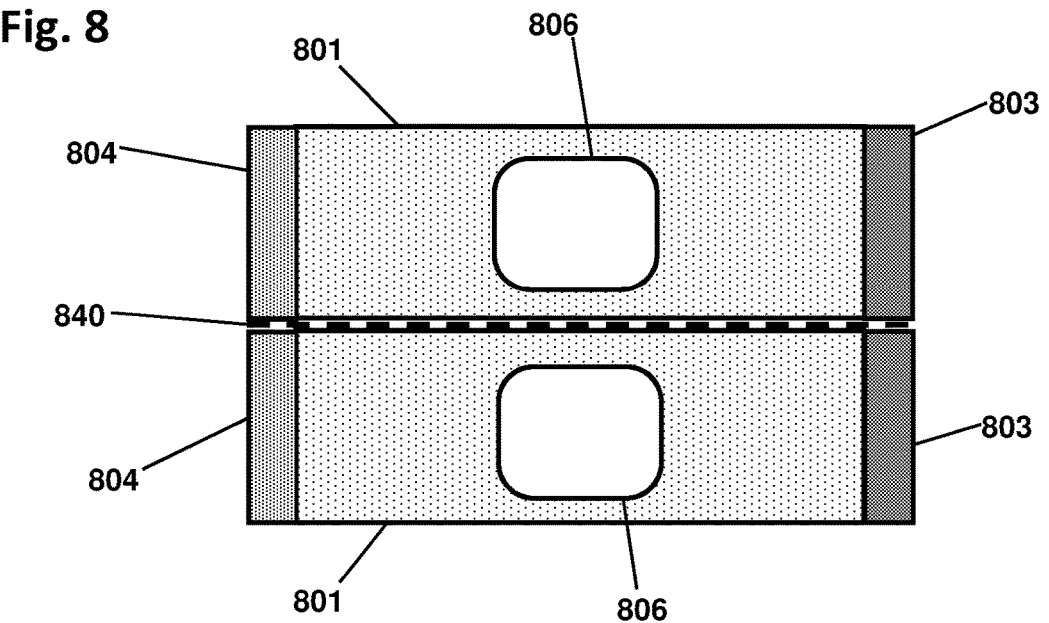
FIG. 8 is a cross-section sketch of an exemplary device including left-front and left-back detectors coupled to the left-side detector, and right-front and right-back detectors coupled to the right-side detector, according to some embodiments.

FIG. 8 is a sketch of an exemplary embodiment of the device with two side detectors 801, two front detector portions 803, two back detector portions 804, an opaque separator 840 (which may be reflective), and light sensors 806 mounted on the top surfaces of the side detectors 801 to avoid blocking incoming particles. Each front and back detector 803-804 may be optically coupled to one of the side detectors 801 respectively, so that all three detectors 801, 803, and 804 on one side can be viewed by one of the light sensors 806, and likewise for the detectors on the other side. The device can detect sources in front and behind the device according to whether the front detector portions 803 or the back detector portions 804 have higher detection rates. The device can determine the sign of the source angle by subtracting detection data of one of the side detectors 801 from the other, thereby obtaining a differential. The device can determine the source angle by adding the detection data of the two front detector portions 803 (if the source is in the front) or of the two back detector portions 804 (if the source is in the back), and dividing the differential by that sum to get a ratio, then applying a predetermined angular correlation function that relates the ratio to the source angle magnitude. The embodiment may be economically because only two light sensors 806 are needed.

Figure 9:
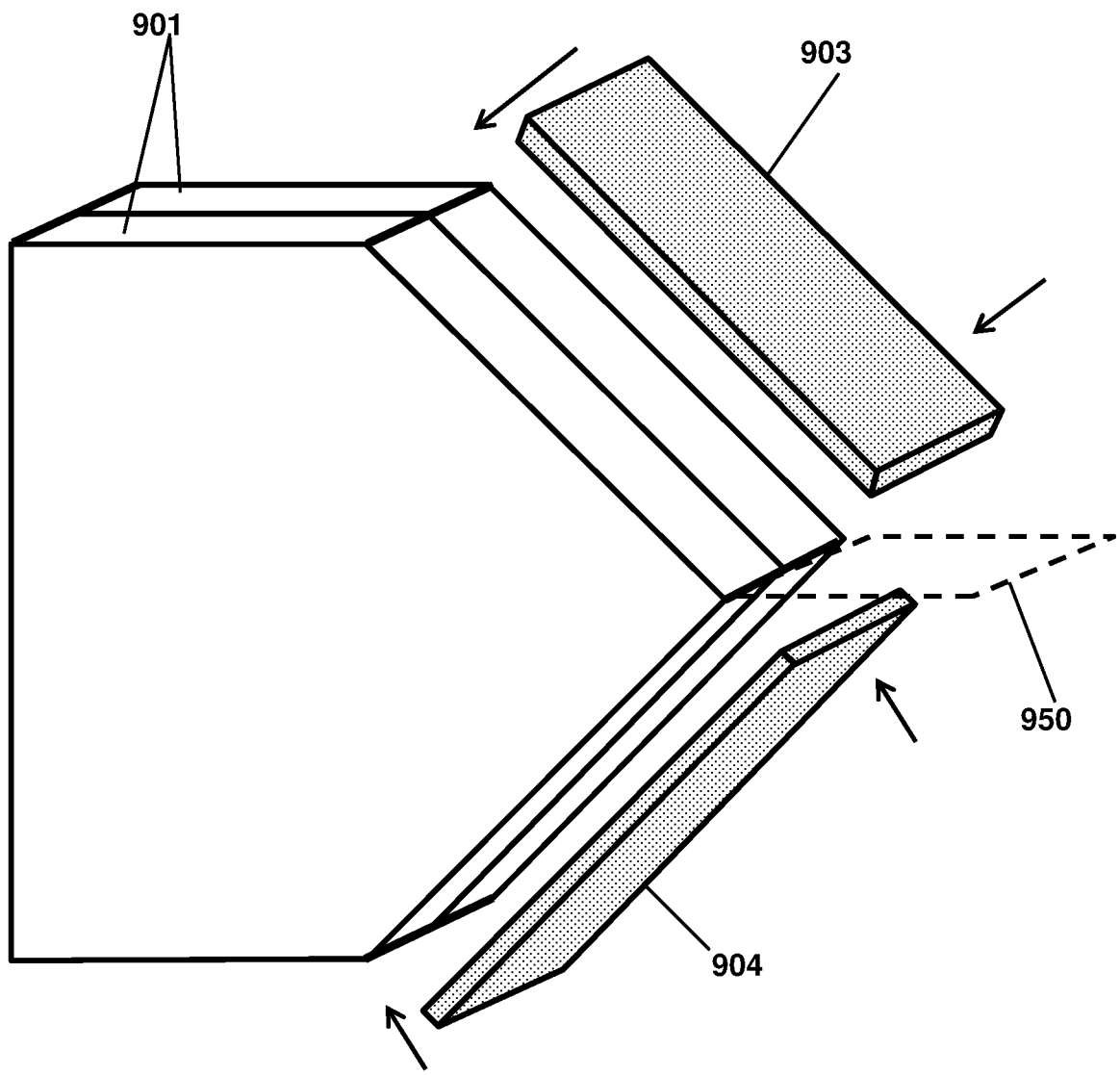
FIG. 9 is a sketch in perspective, partially exploded, of an exemplary device with separate front detectors mounted orthogonal to each other, configured to determine both horizontal and vertical angles of the source, according to some embodiments.

FIG. 9 shows an exemplary embodiment of the device in perspective, partially exploded, with the front detector being divided into upper and lower portions. Two side detectors 901 may be shaped to a frontward point, in this case a 90-degree point, at the midplane 950. An upper front detector 903 and a lower front detector 904 may then be installed across the diagonal surfaces above and below the midplane 950 respectively. The depicted device can provide a determination of both the horizontal and vertical angles of the source. The horizontal angle may be obtained by adding the counting rates of the upper and lower front detector counting rates 903 and 904, thereby obtaining a total front counting rate. Then the difference between the two side detector 901 counting rates may be found by subtraction, and that differential may be divided by the total front counting rate, and the ratio may be compared to a predetermined angular correlation function, thereby obtaining the sign and magnitude of the horizontal angle of the source.

To estimate the vertical source angle, the lower front detector 904 counting rate may be subtracted from the upper front detector 903 counting rate to obtain a vertical differential, and the two side detector 901 rates may be added to get a sum. The device may then divide the vertical differential by the sum to obtain a vertical ratio, which may then be compared to a predetermined vertical angular correlation function. Since the upper and lower front detectors 903 and 904 are perpendicular to each other in this design, the difference in their counting rates is a sensitive measure of the vertical source angle. Hence in this embodiment the vertical ratio may provide a measure of the vertical source angle magnitude as well as its sign. In addition, the vertical angle may indicate that the source is on the midplane 950 when the upper and lower front detectors 903 and 904 have substantially equal detection rates.

Figure 10:
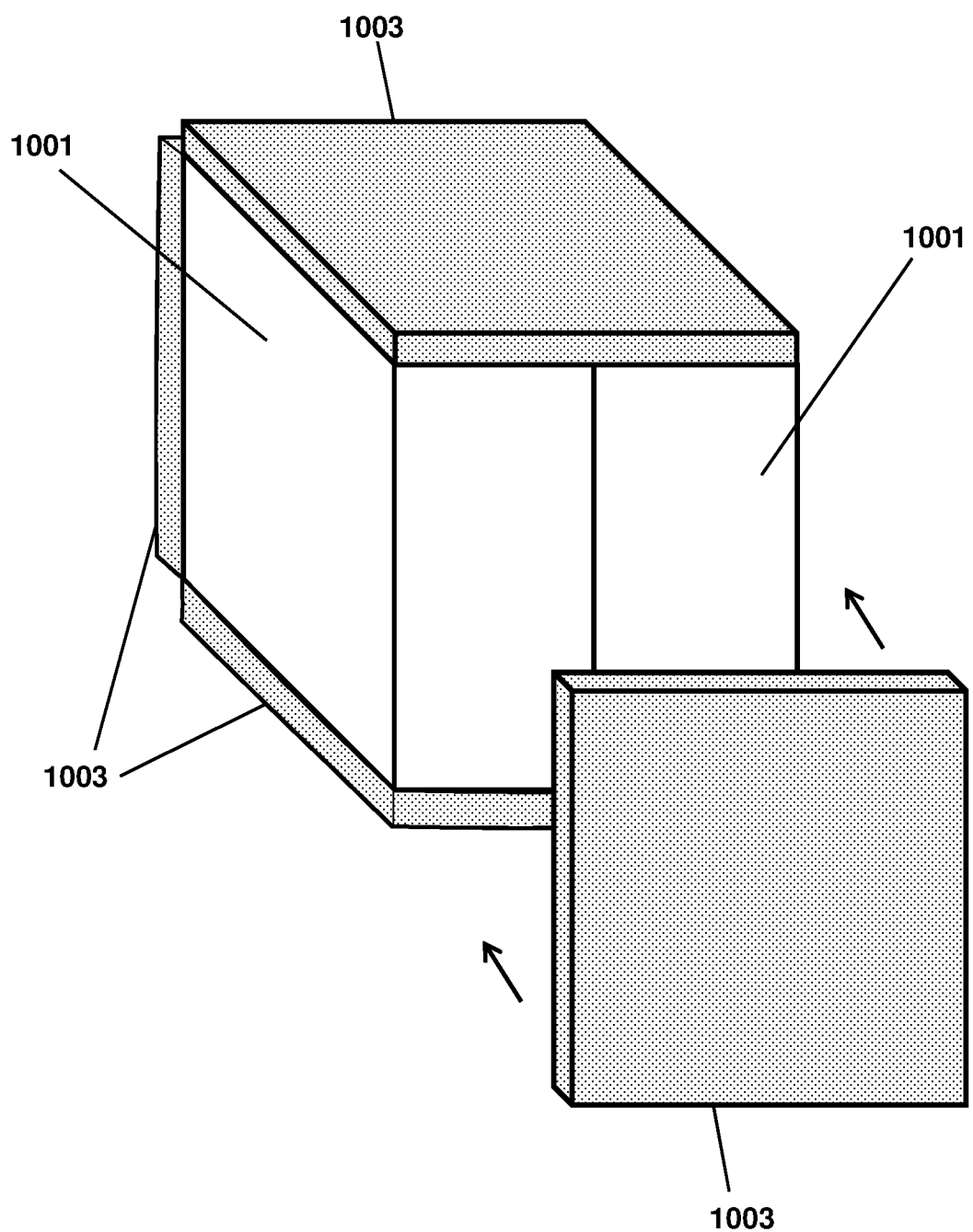
FIG. 10 is a sketch in perspective, partially exploded, of an exemplary device with four orthogonal detectors positioned in front, back, top, and bottom of the device, according to some embodiments.

FIG. 10 shows in perspective, partially exploded, an exemplary configuration of the device as a cuboid sandwich array for omnidirectional detection. The device has four "orthogonal detectors" 1003, each of which can act as a front detector. Each orthogonal detector 1003 is oriented perpendicular to the side detectors 1001 and positioned on the front, top, back, and bottom respectively of a cuboid sandwich assembly comprising the side detectors 1001. The device can determine the source location by comparing or interpolating or otherwise fitting the signals from each of the four orthogonal detectors 1003, thereby determining which has the highest counting rate, and thereby determining whether the source is in front, or behind, or above, or below the device. The device can then determine the source angle according to the particle detection rate of a selected one of the orthogonal detectors 1003 that has the highest particle detection rate. In addition, the detection rates in the four orthogonal detectors 1003 may be interpolated or otherwise combined to provide an improved determination of the source location.

Alternatively, the device may be turned on its side so that the aiming plane is horizontal, and can then determine the horizontal angle by comparing the counting rates in the four orthogonal detectors 1003, and also can determine the vertical angle of the source by analyzing the side detectors 1001 divided by one of the orthogonal detectors 1003 according to the angular correlation method.

Figure 11:
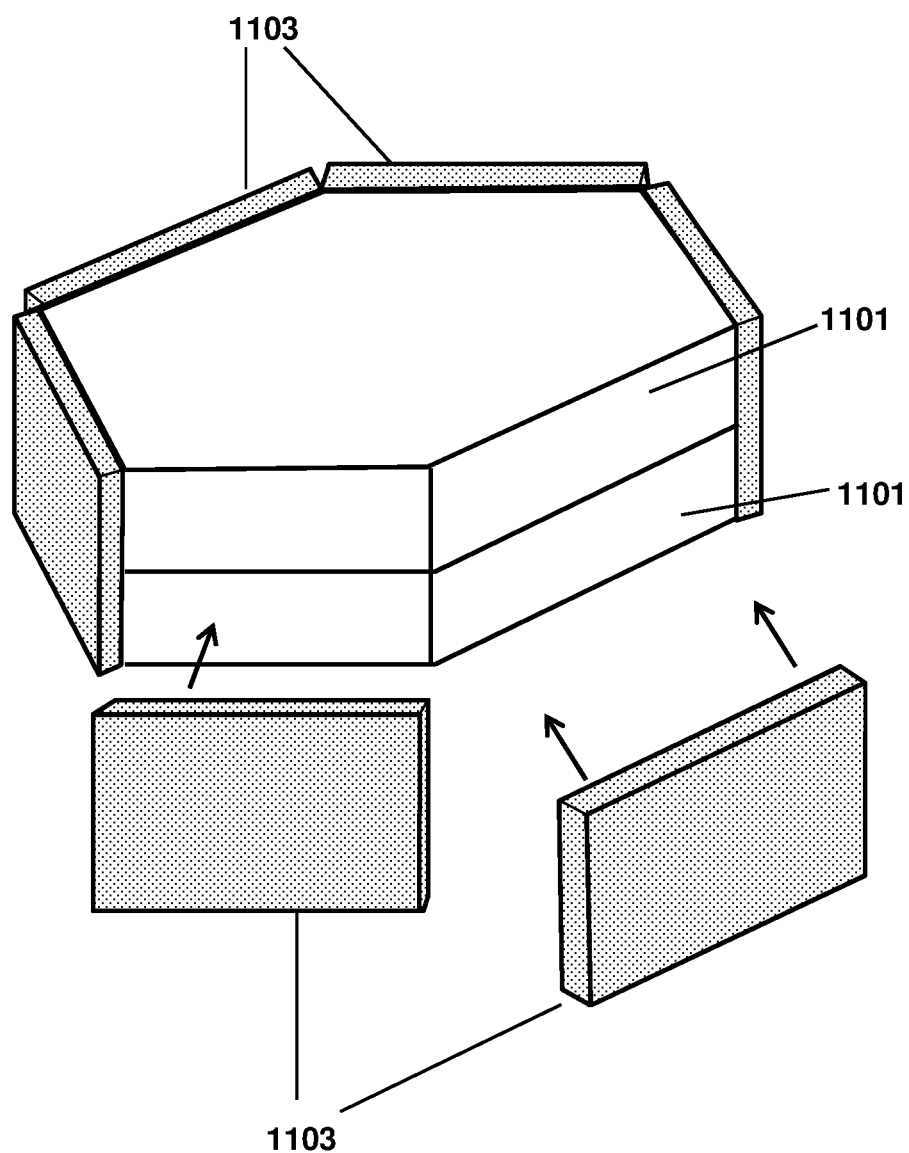
FIG. 11 is a sketch in perspective, partially exploded, of an exemplary device with a horizontal aiming plane and with six orthogonal detectors surrounding the device, according to some embodiments.

FIG. 11 shows an exemplary configuration of the device in perspective, partially exploded, comprising a hexagonal sandwich array surrounded by orthogonal detectors. The depicted device includes two hexagonal side detectors 1101 and six rectangular-shaped orthogonal detectors 1103 which are mounted against the six edge flats of the hexagonal assembly and perpendicular to the side detectors 1101. Each orthogonal detector 1103 can serve as a front detector. The device can measure the vertical angle of the source according to the difference between the two side detector 1101 rates divided by the sum of all the orthogonal detector 1103 rates. The device can also determine the approximate horizontal angle of the source according to which of the orthogonal detectors 1103 has the highest and lowest counting rates, or by fitting the orthogonal rates to a source model, or by subtracting each orthogonal detector rate from its opposite orthogonal detector, among other possible analysis means.

Figure 12:
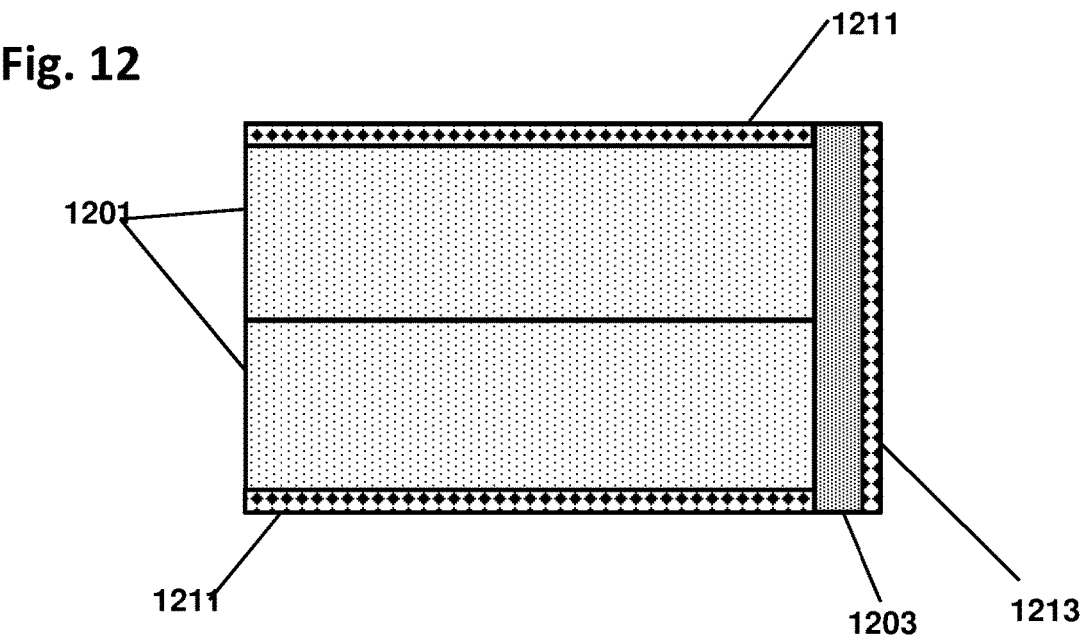
FIG. 12 is a top-view cross-section sketch of an exemplary embodiment of the device including thin counters overlaid on the front and side detectors, according to some embodiments.

FIG. 12 is a cross-section sketch of an exemplary embodiment of the device including additional counters (shown in checkerboard) configured to detect different particles or different energy ranges than the detectors. In some embodiments, two side counters 1211 are adjacent to the two side detectors 1201 respectively, and a front counter 1213 is adjacent to the front detector 1203. The side and front counters 1211 and 1213 may each comprise a layer or thin slab configured to detect particles such as energetic electrons or ions. The counters 1211 and 1213 may be thinner than the corresponding detectors 1201 or 1203. For example, the thickness of the counters 1211 and 1213 may be at most 5% or 10% or 20% or other fraction of the thickness of the side detectors 1201. The counters 1211 and 1213 may be configured to detect a different particle type than the detectors 1201 and 1203, thereby enabling detection and localization of two different sources at the same time. For example, the processor may be configured to be communicatively coupled to the side counters 1211 and the front counter 1213, and thereby determine the sign of the source angle by comparing signals in the two side counters 1211, and determine the magnitude of the source angle by calculating a ratio of the signals in the front counter 1213. Alternatively, the counters 1211 and 1213 may be configured to detect a different particle energy than the detectors 1201 and 1203, thereby enabling detection and localization of two different energy ranges of the same particle type, such as low-energy and high-energy neutrons. The counters 1211 and 1213 may be optically coupled to the respective detectors 1201 and 1203, thereby enabling a shared light sensor to view each detector-counter sandwich together.

In some embodiments, each side detector 1201 and the front detector 1203 may be configured to detect gamma rays while the side and front counters 1211 and 1213 may be configured to detect low-energy neutrons. For example, the detectors 1201 and 1203 may include a non-hydrogenous scintillator such as CsI or $BaF_2$ or BGO, and the counters 1211 and 1213 may include thin neutron-sensitive side-detector coatings such as LiF—ZnS in a transparent PMMA matrix, or an elpasolite that includes lithium or boron such as CLYC ($Cs_2LiYCl_6$:Ce), or a thin semiconductor with a thin lithium or boron coating.

Alternatively, the detectors 1201 and 1203 may be configured to detect neutrons while the counters 1211 and 1213 may be configured to detect gamma rays. For example, the detectors 1201 and 1203 may include PSD (pulse-shape discriminating) scintillator to detect recoil protons, while the counters 1211 and 1213 may include thin $CdWO_4$ for detection of low energy gamma rays.

Figure 13:
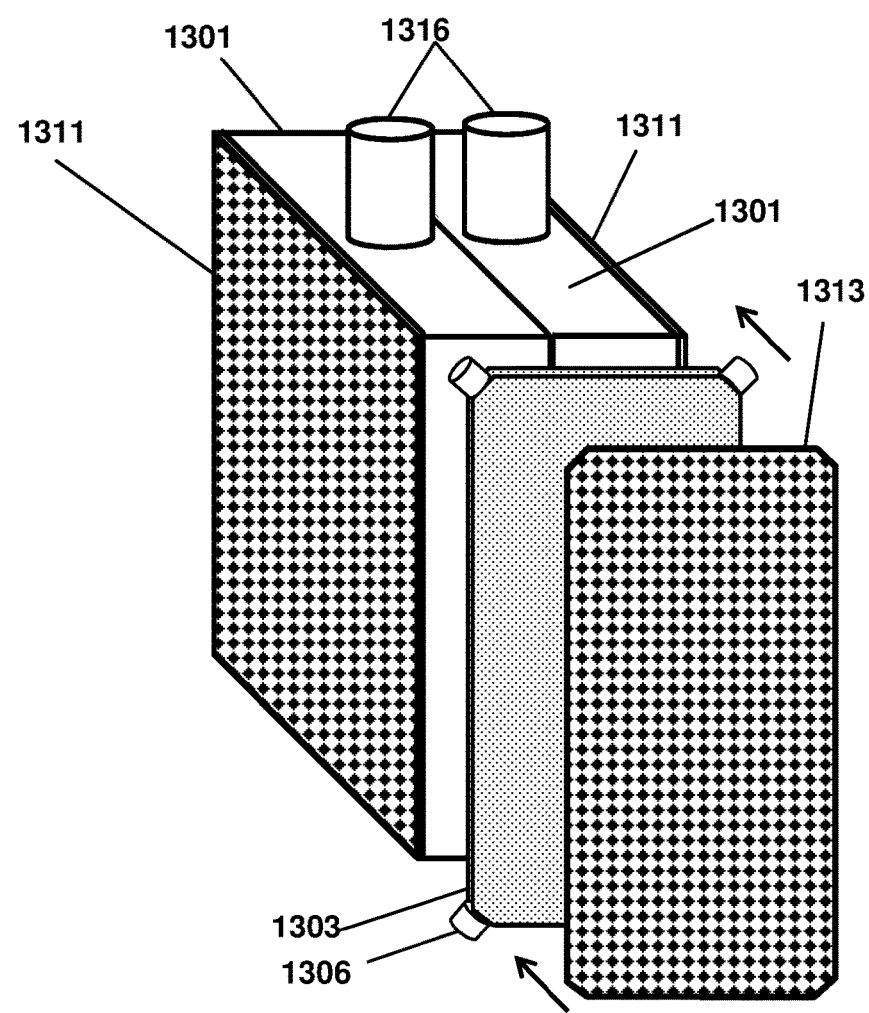
FIG. 13 is a perspective sketch, partially exploded, showing how the embodiment of FIG. 12 may be assembled, according to some embodiments.

FIG. 13 is a perspective sketch, partially exploded, of the embodiment of FIG. 12, with two side detectors 1301 coupled to side counters 1311 respectively, and a front detector 1303 coupled to a front counter 1313. The side detectors 1301 are viewed by sensors 1316, and the front detector 1303 is viewed by sensors 1306. Counters are shown in checkerboard hatch.

Figure 14:
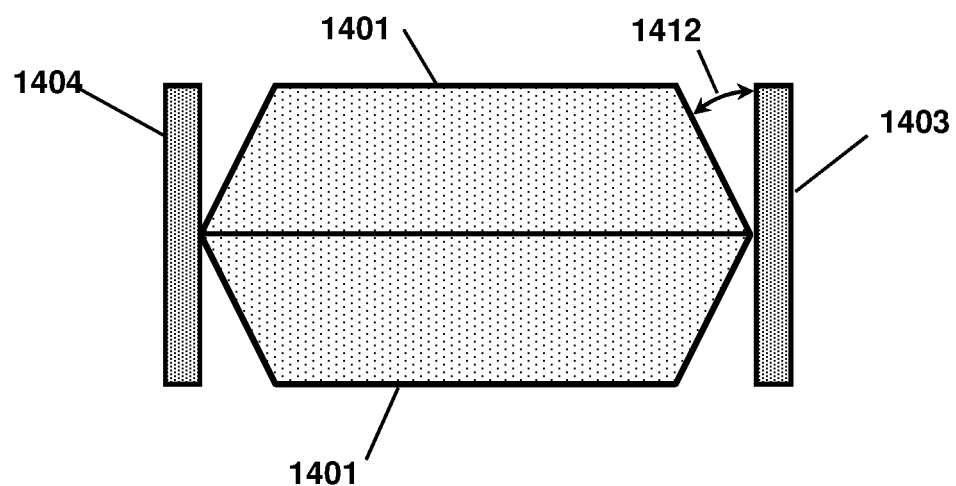
FIG. 14 is a cross-section sketch of an exemplary embodiment of the device in which the side detectors are beveled at an angle relative to the aiming plane, according to some embodiments.

FIG. 14 is a cross-section sketch of an exemplary embodiment of the device including two side detectors 1401, a front detector 1403, and a back detector 1404. The side detectors 1401 are beveled at their front and back surfaces by an angle 1412 configured to reduce detection of particles that pass through the front detector 1403 and then could strike the downstream side detector 1401 absent the bevel. The bevel thereby enhances the contrast between the angular sensitivity distributions of the two side detectors 1401. The bevel angle 1412 may be any angle that enhances the side detector 1401 contrast, such as 30 degrees or 45 degrees or 60 degrees for example.

Figure 15:
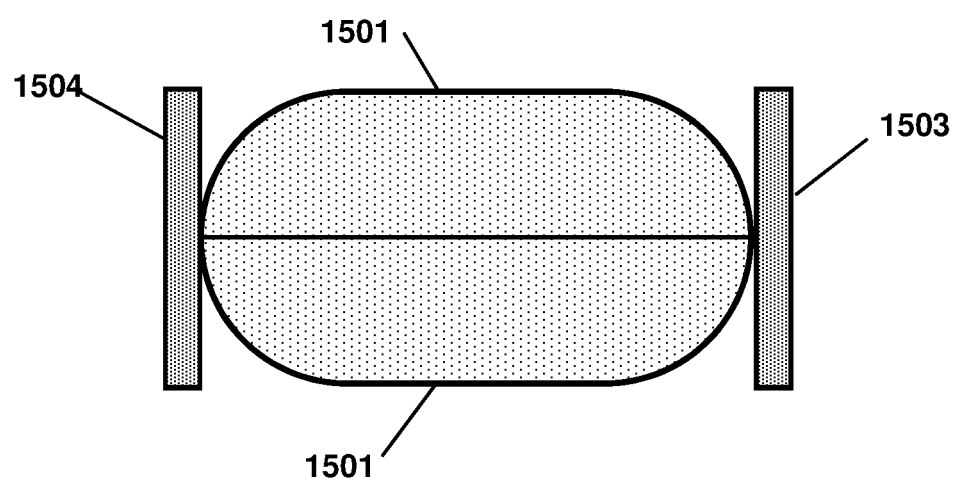
FIG. 15 is a cross-section sketch of an exemplary embodiment of the device in which the side detectors include rounded front and back surfaces, according to some embodiments.

FIG. 15 is a cross-section sketch of an exemplary embodiment of the device including two side detectors 1501, a front detector 1503, and a back detector 1504. The side detectors 1501 are curved at their front and back surfaces forming a quarter-cylindrical shape configured to reduce detection of particles that could pass through the front detector 1503 and then strike the downstream side detector 1501, absent the curved shape. The curved shape thereby enhances the contrast between the angular sensitivity distributions of the two side detectors 1501.

Figure 16:
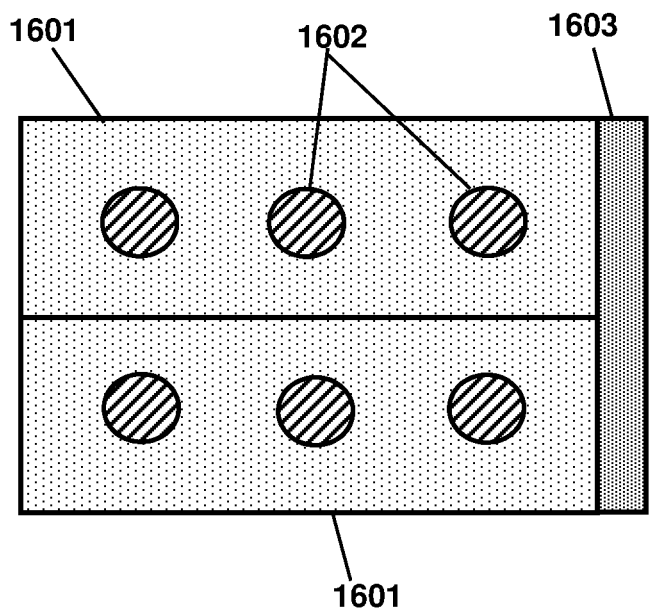
FIG. 16 is a cross-section sketch of an exemplary embodiment of the device including embedded counters in the side detectors, according to some embodiments.

FIG. 16 is a cross-section sketch of an exemplary embodiment of the device including two side detectors 1601, a front detector 1603, and embedded counters 1602 which are configured to detect particles. At least one embedded counter 1602 may be embedded in each of the side detectors 1601 respectively. Herein, a counter is "embedded" in a detector if the counter is completely surrounded by the detector, other than the ends of the counter which optionally may be exposed to the outside. The embedded counters 1602 may be configured to detect a different particle type than the detectors 1601 and 1603, or the embedded counters 1602 may be configured to detect a different energy range than the detectors 1601 and 1603. The embedded counters 1602 may be read out or viewed by sensors separate from those attached to the side detectors 1601. Alternatively each side detector 1601 and its embedded counter or counters 1602 may be viewed by a shared sensor, in which case the side detectors 1601 and the embedded counters 1602 may comprise scintillators that emit different pulse shapes.

Figure 17:
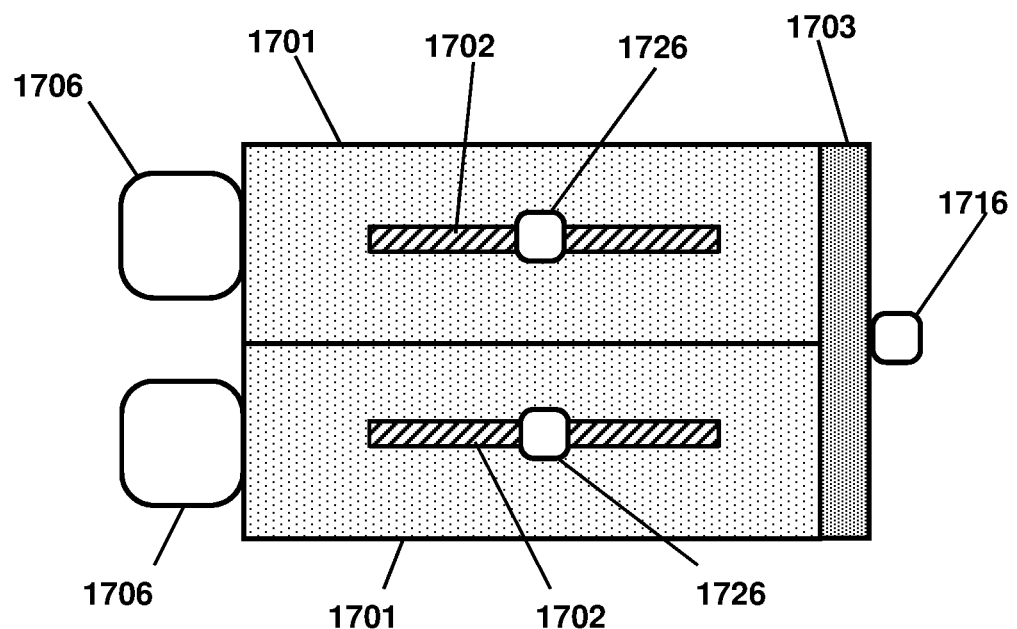
FIG. 17 is a cross-section sketch of an exemplary embodiment of the device including embedded counters in the side detectors with separate light sensors, according to some embodiments.

FIG. 17 is a cross-section sketch of an exemplary embodiment of the device including two side detectors 1701, a front detector 1703, two embedded counters 1702, two sensors 1706 coupled to the two side detectors 1701 respectively, a front sensor 1716 coupled to the front detector 1703, and two additional sensors 1726 coupled to the two embedded counters 1702 respectively. In some embodiments, the embedded counters 1702 may be isolated from the surrounding side detectors 1701 (by opaque reflective foil for example) so that the embedded counter signals can be received by the additional sensors 1726, and the signals from the side detectors 1701 can be separately received by the sensors 1706 respectively. Thus in this configuration, the signals from the detectors 1701 are kept separate from the signals from the embedded counters 1702.

In some embodiments, the side detectors 1701 may include a hydrogenous scintillator such as a PVT-based plastic scintillator configured to detect gamma rays as well as energetic neutrons by proton recoil, and the embedded counters 1702 may be configured to detect low-energy neutrons exclusively using, for example, ZnS—LiF blend in a PMMA matrix with a wavelength shifter. Then the hydrogenous scintillator of the side detectors 1701 may act as a moderator for the high energy neutrons, while the embedded counters 1702 may detect the moderated low-energy neutrons. In that case the time signature of the neutron detection events is quite specific, with a large pulse followed by a series of smaller pulses in the hydrogenous side detectors, and then later a large pulse in the embedded counter. The hydrogenous scintillator pulses, due to the neutron repeatedly scattering in the hydrogenous scintillator, typically span a period of 50-100 ns. The final pulse from neutron capture in the embedded detector typically occurs 1-50 microseconds later, due to the time required for a moderated neutron to drift into the embedded detector and be captured there. The signal indicating the capture is a large multi-MeV pulse, produced in the associated embedded detector 1702, due to energetic ions emitted into the ZnS scintillator. The characteristic time series of pulses thereby indicates that a fast neutron was detected.

The device can also detect low-energy neutrons in the embedded counters 1702 by neutron capture, but without the preceding recoil pulses in the side detector 1701 since the low-energy neutrons have already lost most of their kinetic energy.

In this way the exemplary embodiment can detect gamma rays from the source, and can localize the source according to the gamma ray detections, and can also detect fast neutrons from the source, and can also determine which side of the device the fast neutrons arrive from, and can separately detect thermal neutrons non-directionally. These parameters are likely of great interest to inspectors for identifying threat items in cargo.

Figure 18:
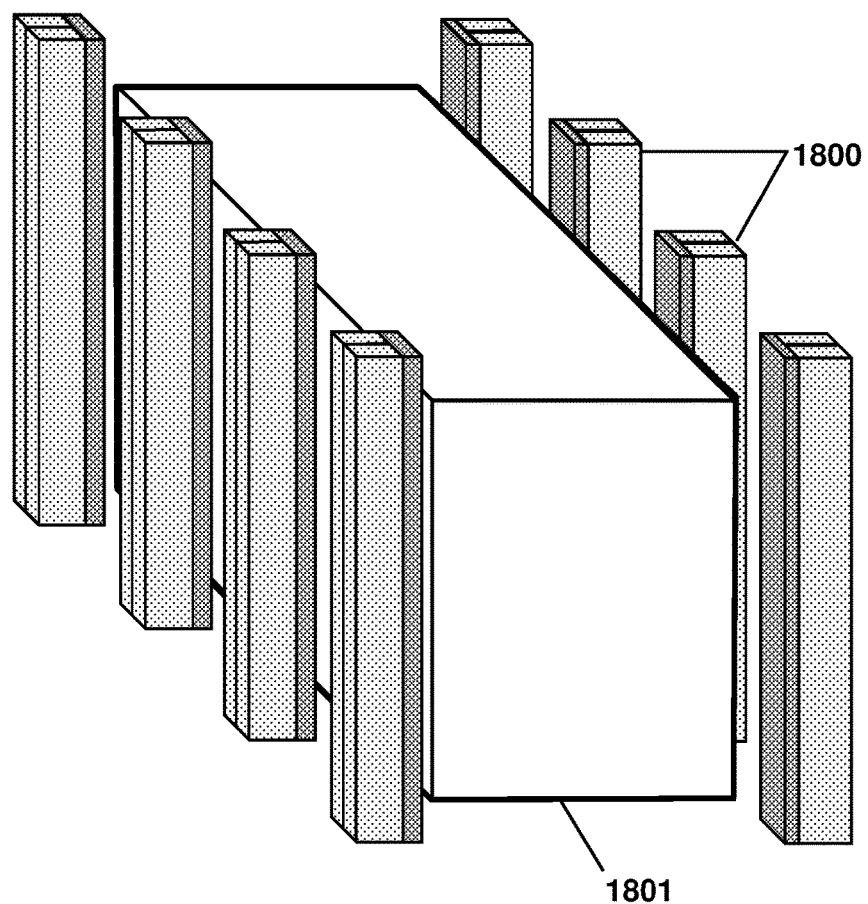
FIG. 18 is a perspective sketch of an exemplary embodiment of a vehicle inspection station incorporating the device, according to some embodiments.

FIG. 18 is a perspective sketch of an exemplary vehicle/cargo scanner comprising a large number of the directional devices 1800 arrayed around an inspection object such as a truck or shipping container 1801. Each of the devices 1800 may be configured to detect gamma rays or neutrons or both. Each device 1800 may be configured to determine the angle of a source relative to its own aiming plane, so that the angular results from all the devices 1800 may then be combined to determine the source location in the container 1801 by triangulation. Alternatively, the devices 1800 may be configured to provide the raw data from each detector to a facility computer configured to analyze all the data together, for example using a global fit or source model to determine the most likely location of the source or sources using all of the raw the data together. Such a global analysis may be more sensitive and more accurate than analyzing each device 1800 separately, particularly when the source is faint or well-shielded.

In some embodiments, some of the devices 1800 may be mounted horizontally to measure the elevation angle of the source, while the other devices 1800 may be mounted vertically as shown. Then the data can be used to determine the three-dimensional distribution of radiation sources, using a three-dimensional source model or a 3-D fit for example. Such a global fit may also reveal the spatial distribution of sources or shields, since particles from a shielded source are likely to be scattered and redistributed across a larger volume than the source itself.

In some embodiments, some of the devices 1800 may include gamma-blind neutron-sensitive detectors, while others may include neutron-blind gamma-sensitive detectors, thereby localizing gamma sources and neutron sources separately. Alternately, the devices 1800 may include ionization-density-dependent detectors that emit detectably different signals upon detecting neutrons and gamma rays respectively. In addition, some of the devices 1800 may be configured to detect fast neutrons only, by proton recoil for example, while others are configured to detect slow neutrons only, by neutron capture. Alternatively, some devices 1800 may be configured to detect high energy gamma rays by Compton scattering, while others may be configured to detect low energy gamma rays by photoelectric absorption. Such an array can determine (a) whether a gamma ray source is present in the cargo, (b) if so, where the gamma source is, (c) whether a neutron source is present in the cargo, and (d) if so, where the neutron source is, and (e) shielding distributions for each of the above, and (f) all of the above for multiple sources at once. This information enables faster scanning, faster localization of threats, and faster discrimination of threats from benigns compared to conventional detectors.

Figure 19:
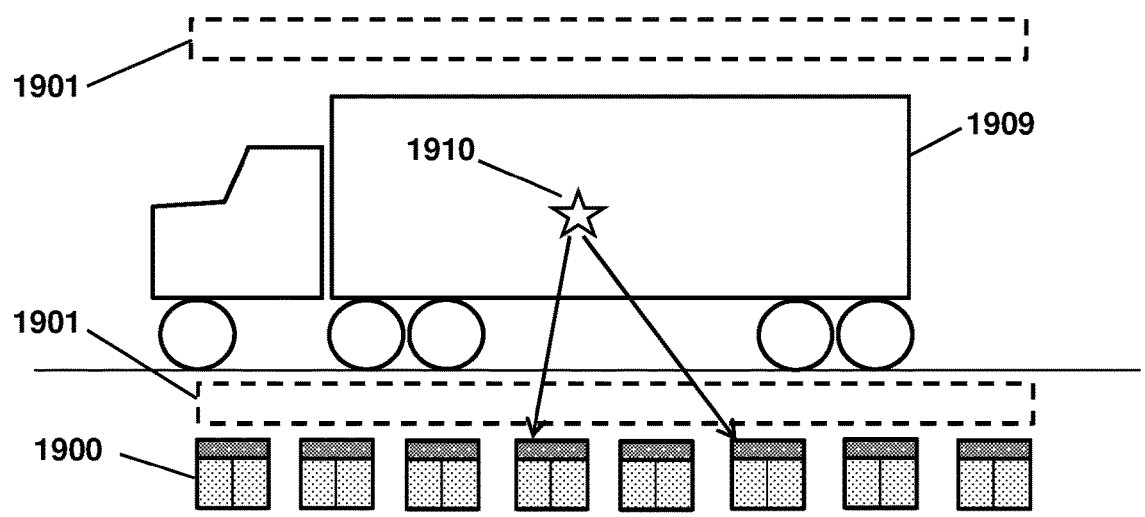
FIG. 19 is a cross-section sketch of an exemplary embodiment of a vehicle inspection station including cosmic ray tracking chambers.

FIG. 19 is an elevation sketch of an exemplary embodiment of a vehicle/cargo inspection station comprising two cosmic ray tracking chambers 1901 positioned above and below an inspection object 1909 containing a threat item 1910 which emits particles (arrows), and an array of the directional devices 1900 positioned below the lower tracking chamber 1901. The tracking chambers 1901 may be configured to measure the track directions of cosmic rays (principally GeV muons at sea level) that pass through the inspection object 1909. The threat item 1910 generally includes very high-Z materials (Z being the atomic number) such as uranium and/or plutonium, or shielding materials comprising lead and/or tungsten and/or bismuth for example. Those cosmic rays that pass through the threat item 1910 are likely to experience large-angle scattering, at angles substantially higher than normally observed in low-Z benign cargo. Thus the cosmic ray tracking chambers 1901 can detect the presence of the threat item 1910 by detecting large-angle scattered cosmic rays that pass through a particular region of the inspection object 1909. Simultaneously, the array of directional devices 1900 can detect gamma rays or neutrons emitted from the threat item 1910, thereby localizing the threat item 1910. Since the devices 1900 are all below the lower tracking chamber 1901, any scattering introduced by the devices 1900 would have no effect on the scattering measurement. Also, the tracking chambers 1901 are typically made from low-Z materials such as hollow aluminum tubes, and therefore are relatively transparent to the high-energy gamma rays and neutrons emitted by the source. Therefore the presence of the lower scattering chamber 1901 may not significantly block the particles and thus may not prevent the underlying devices 1900 from detecting radiation signatures. The two systems may therefore avoid interfering with each other while cooperating to detect threats in two different ways.

An advantage of the combined detection modalities, of cosmic ray scattering and radiation detection, is that the two techniques can reinforce each other in detecting and localizing threat items 1910. Another advantage is that the two modalities can thwart any attempt at concealment. For example, if an adversary tries to reduce the cosmic ray scattering signature by reducing the amount of high-Z gamma ray shielding, the gamma signature would thereby be increased, leading to faster detection of the source. And if the adversary tries to reduce the radiation signature by adding more shielding, the scattering signature would be increased. Thus the dual-modality inspection leaves the adversary with no design space for concealment.

Figure 20:
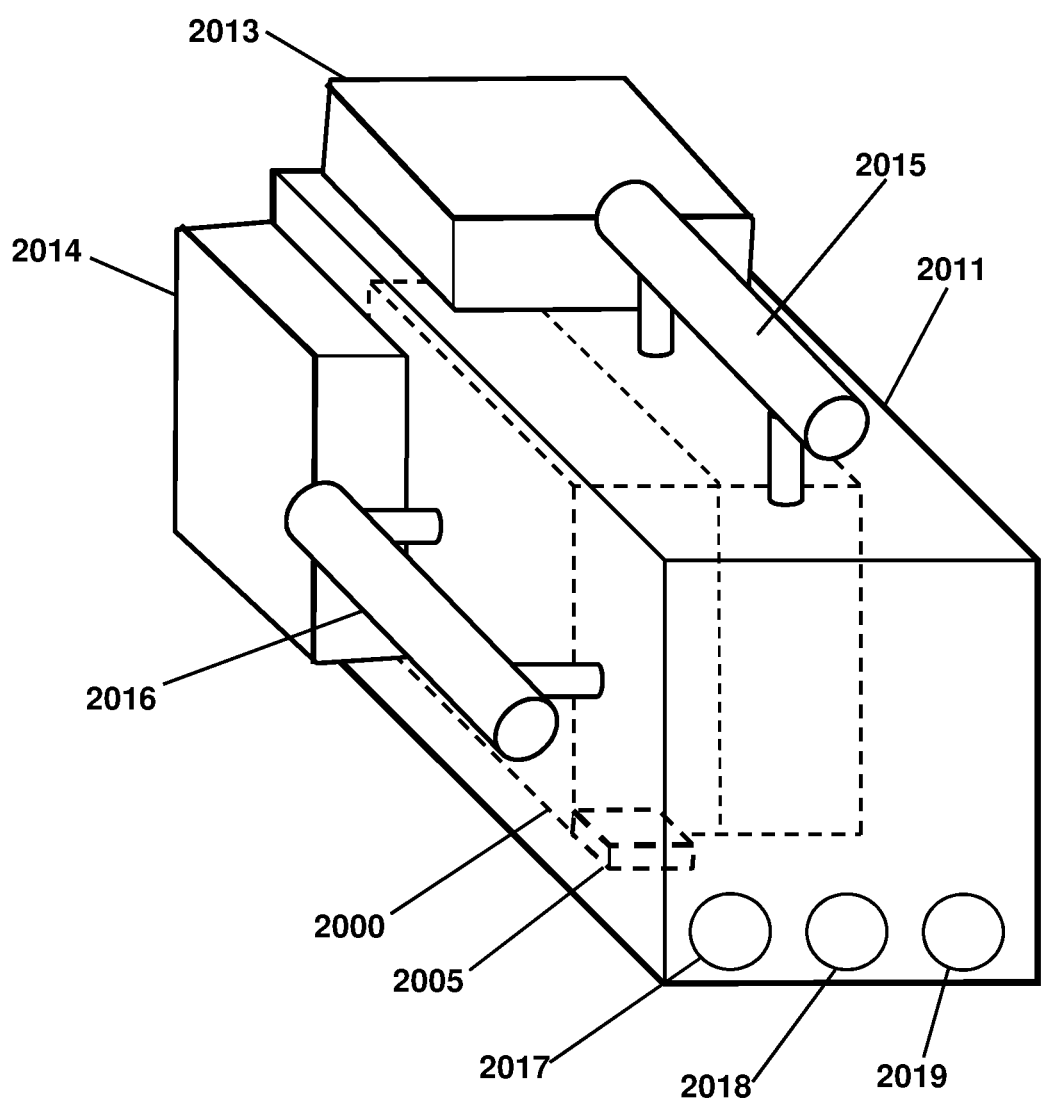
FIG. 20 is a perspective sketch of an exemplary embodiment of a portable directional survey meter, according to some embodiments.

FIG. 20 is a perspective sketch of an exemplary portable radiation survey meter in which an embodiment of the present device 2000 (hidden, shown in dash) is enclosed in a case 2011 including a display 2013 and a handle 2015 for use in measuring the horizontal angle of a source. The figure also shows a second display 2014 and a second handle 2016 mounted orthogonally on the case 2011, thereby allowing an operator to easily turn the meter on its side, and thereby to scan for sources in the vertical direction.

Also shown notionally are an electronic compass 2017, a GPS receiver 2018, and a multi-axis accelerometer 2019. The compass 2017 can measure the geographical bearing of the meter, and thereby enable the embedded processor 2005 to determine the source angle in a ground-based coordinate system. The GPS receiver 2018 can determine the spatial position of the meter, which can then be recorded internally or transmitted to an external receiver. The position of a source can then be determined by triangulation using two measurements of the source angle made at two different locations, for example using two separate portable survey meters, or using sequential measurements by the same meter at the two locations.

The accelerometer 2019 can determine when the meter is turned on its side, thereby allowing horizontal and vertical angle measurements to be properly allocated and stored. The accelerometer 2019 with the compass 2017 can also detect when the meter is moved or rotated quickly. Whenever the meter is rapidly rotated, the displays 2013 and 2014 can be blanked, or changed to show a busy-icon for example, and may remain blanked until sufficient additional detection data are acquired to enable an updated source angle determination. In this way the device can avoid misleading the operator when the device has been rotated quickly and the directional analysis has not yet acquired sufficient data at the new orientation to update the display 2013.

In some embodiments, the processor 2005 may be configured to analyze the detector data to determine a best-fit source angle continuously, or nearly continuously, while further data is accumulated. The processor 2005 may be configured to update the source angle determination after every particle detection event, or at preset intervals such as once per second, using whatever data had been accumulated so far. The displayed source angle may be updated continuously even while the meter is rotated, for example by weighting the most recent data higher than the oldest data so as to accommodate the changes in orientation. For example, the processor 2005 can use an averaging routine such as a time-weighted average, or incremental averaging, or a circular buffer average, or other averaging means to update the source angle continually while discarding or degrading the oldest data as conditions change.

In some embodiments, the processor 2005 may be configured to perform two parallel analyses having different integration times, such as one analysis with a short integration time and another analysis with a long integration time. In the short-integration-time procedure, the detector data may be analyzed frequently using a short integration time, and may thereby provide a rapidly updating display of the calculated angle. Concurrently, a long-integration-time analysis may proceed more slowly but may provide a steadier measure of the source angle with lower uncertainty. Both the fast and slow results may be displayed simultaneously, and updated so that the operator can assess the results visually in real time. For example, the two analysis results may be displayed as a compound arrow, or other icon, having a broad portion that indicates the quick low-resolution analysis, overlain by a sharper and more stable icon according to the long-integration-time results. Alternatively, the fast and slow results may be presented using two separate indicators, or by showing other readily-distinguishable indicators on the display.

In some embodiments, the meter may include a manually-operated control that allows the operator to adjust the integration time as needed. For example, if the operator needs only a rough measure of the source angle, but needs it quickly, then the operator can adjust the integration time shorter. The meter may also include a control by which the operator can freeze the display, thereby enabling a closer review of the results. The meter may include means for recording data such as the counting rates in each detector, the calculated source angle, the presence of neutrons, the location or orientation of the device, the overall radiation level, or other data. The meter may record sound as well, so that the operator's comments can be recorded in real time and can be played back later along with the other data. The meter can transmit the various types of data listed, and other data not listed, to an external receiver and recorded there instead of onboard the device, for additional safety in every contingency.

In some embodiments, the device may include a light beam transmitter configured to produce a light beam. In a first exemplary version, the light beam may be aligned with the device, thereby showing where the device is aimed. The light beam may be configured with an asymmetric beam shape, such as a wedge pointing left or right, thereby indicating the sign of the source angle in real-time. The beam spot may be further configured to indicate the magnitude of the source angle as well, for example being elongated when the source angle is large. The beam shape may also be reduced to a circular spot, or caused to flicker, or otherwise visibly modulated, when the source angle is small or zero, thereby indicating when the device is aimed at the source location. Such a variable light beam shape, indicating the direction of the source as well as the magnitude of the source angle, greatly assists the operator in locating a source quickly.

In an alternate exemplary version, the light beam transmitter may be configured to direct the light beam toward the calculated source location, thereby bathing the source location in a visible spot of light. This greatly assists the operator in determining the source location visually. The beam may be redirected toward the source using, for example, an articulated mirror or other variable optical element. Alternatively, the light beam transmitter itself may be mounted on a hinge or gimbal and rotated so as to aim the light beam to the calculated source location. Such a light beam, being continuously directed toward the source position, may appear to remain "sticky" or "locked on" to the source even as the meter is moved around. If the meter is rotated too quickly for the detection data to keep up, the light beam may be gated off or expanded into a broad beam indicating inconsistent data, and then when additional data is accumulated, the source location can again be determined and the light beam can resume dwelling on the source location. In this way the operator can see immediately where the source is located. The light beam may be flickered or otherwise modulated to increase visibility even in daylight.

In some embodiments, the meter may include an imaging device such as a still or video camera to record the scene, and particularly to image the source location when it is discovered. The camera may be activated during each acquisition of scintillator data, or manually by an operator, or continuously, or upon a computer command, or whenever the device is rotated, or otherwise. The light beam transmitter, if present, may be gated off or otherwise modulated while the image or images are acquired, or the beam spot may be left on so as to appear in the image.

The image may be centered on the calculated source location, using a rotatable mirror or by rotating the camera, for example. As the source location uncertainty is steadily improved with additional data, the image may be zoomed in accordingly.

In some embodiments, the meter may include non-visual indicators such as acoustical or haptic indicators, which may be activated according to certain events. For example the processor 2005 may be configured to activate a haptic or acoustical pulse whenever the source angle has been updated. Alternatively, the processor 2005 may be configured to trigger the acoustical or haptic indicators when the aiming plane becomes aligned with the source. The processor 2005 may be configured to modulate the acoustical or haptic indicators so as to indicate the left-right direction of the source, thereby further assisting the operator in finding the source without having to look away from the scene. The processor 2005 may be configured to modulate the acoustical or haptic indicators so as to indicate the magnitude of the source angle, for example being modulated more quickly as the source is approached. Two haptic indicators may be incorporated in a device handle and activated to indicate to the operator whether the source is to the right or left side of the device. The acoustical or haptic indicators may also serve as a hazard warning, by being activated in a characteristic way whenever the radiation level is above a safety threshold.

Figure 21:
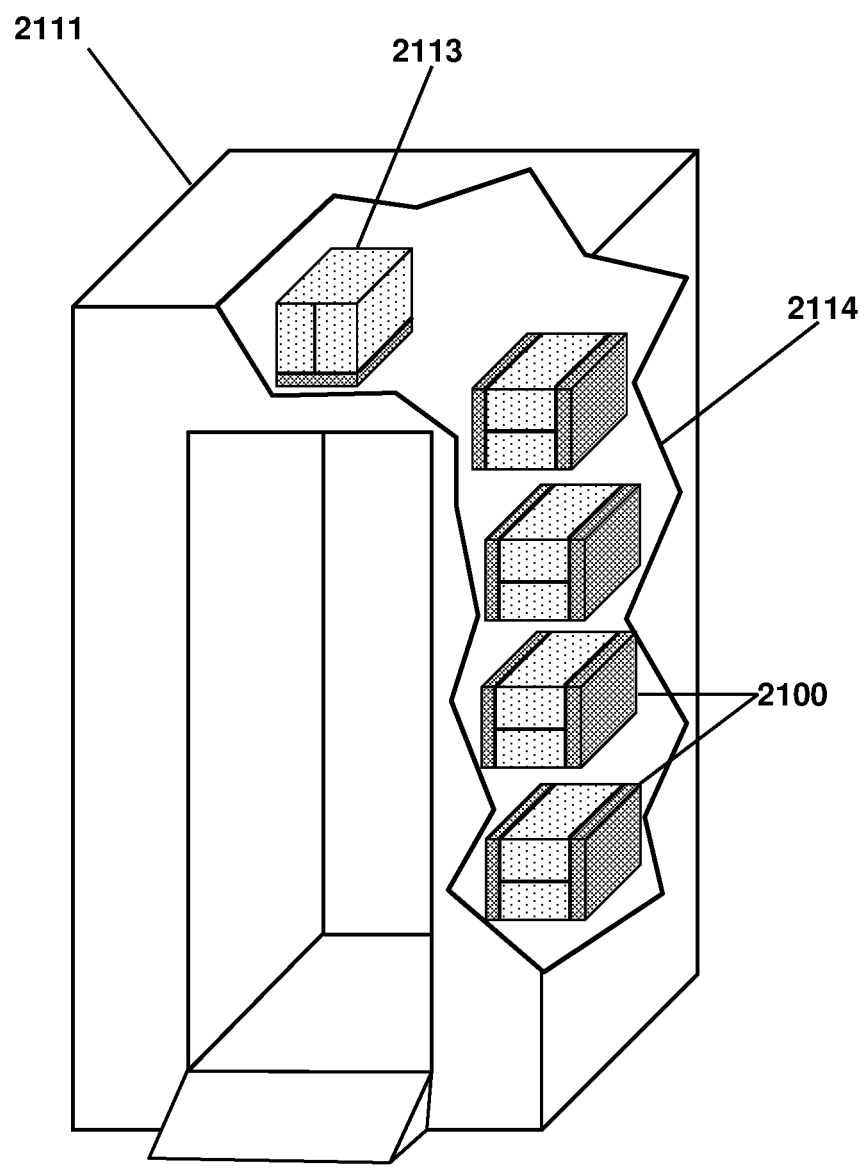
FIG. 21 is a sketch in perspective, partly cut-away, of an exemplary embodiment of a walk-through portal with multiple copies of the device arranged in the walls of the portal, according to some embodiments.

FIG. 21 shows in perspective, partially cut-away 2114, an exemplary embodiment of a walk-through portal 2111 in which a plurality of the present devices 2100 are mounted. In this portal embodiment, some of the devices 2100 may be mounted with their aiming planes horizontal so that each device 2100 can measure the vertical location of a source. The portal 2111 can thus provide a very sensitive detection of smuggled radioactive material, and can also indicate whether the material is hidden in the person's shoes or pockets or hair or body cavity or wherever. This provides enhanced safety by detecting contamination on workers, and also prevents loss or pilfering of radioactive material.

As depicted, the devices 2100 in the side posts are double-sided, such as the embodiment depicted in FIG. 7, thereby enabling detection of someone attempting to evade the portal by carrying a source around the portal 2111. The double-sided devices 2100 can then detect the presence of a radioactive source inside or outside the portal 2111. In addition, an overhead device 2113 is shown positioned for maximum sensitivity to contamination or pilferage in a worker's hat or hair. The overhead device 2113 is shown as a single-sided detector since there is no need for a double-sided device here; any attempted pilferage by climbing over the portal 2111 would be detected by the other devices 2100 since they are sensitive to radiation sources both inside and outside the portal 2111.

Figure 22:
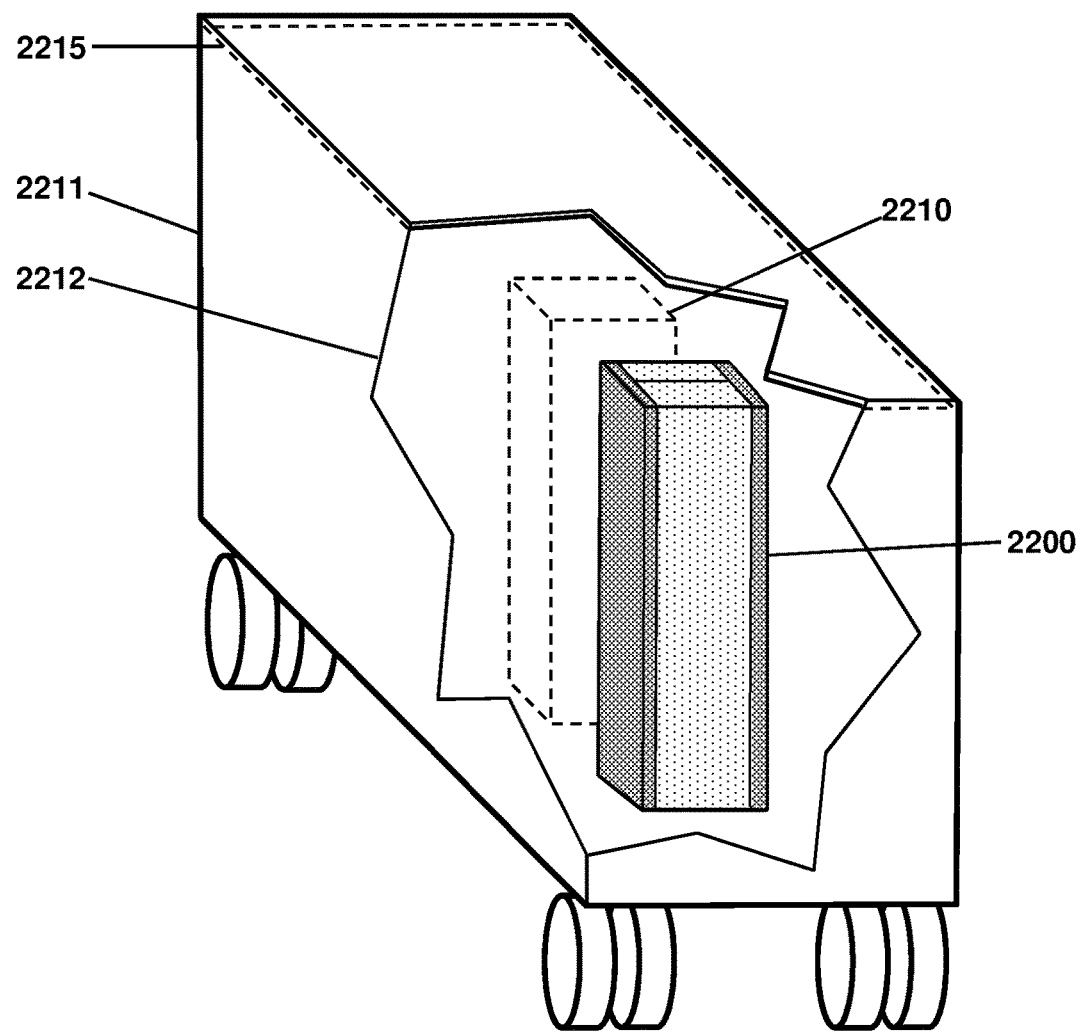
FIG. 22 is a sketch in perspective, partly cut-away, of an exemplary embodiment of a mobile radiation scanner containing multiple copies of the device, according to some embodiments.

FIG. 22 shows in perspective an exemplary embodiment of a mobile radiation scanner vehicle 2211 which can detect hidden sources in, for example, an urban environment. The scanner vehicle 2211, partially cut-away 2212, includes a directional device 2200 as disclosed herein. The device 2200 may be elongated in the vertical direction, for example extending the full height of the scanner vehicle 2211, to maximize the detection area. As shown, the device 2200 may be of the bidirectional type as disclosed in FIG. 7, with two symmetrically placed orthogonal detectors front and back, thereby providing efficient detection of particles from all around the scanner vehicle 2211. Also shown notionally, in dash, are additional copies 2210 of the device 2200. The additional copies 2210 may be arranged as a wall of the devices 2200, along the centerline of the scanner vehicle 2211, and preferably fitting as many such devices 2200 as possible while still providing space between them to avoid self-shadowing. Also shown is an optional cosmic ray veto counter 2215 comprising a plastic scintillator, for rejecting cosmic ray backgrounds.

As the scanner vehicle 2211 is driven around an inspection region, the various detector counting rates may be recorded in real-time, along with the GPS coordinates and bearing. Due to the motion of the scanner vehicle 2211, the directional data may be sufficient to generate a radiation map of the area by fitting the results to a two-dimensional radiation distribution, for example. The radiation map may be superposed on or otherwise related to a map of the area including buildings and other structures for example. High sensitivity may be achieved due to the large area of the array of detector devices 2200, as well as the high efficiency and angular directionality of each device 2200, according to some embodiments. After a detailed radiation map is completed, any future changes to the radiation distribution may be detected in subsequent scans, thereby triggering a secondary scan for confirmation and isotopic identification of the suspicious radiation pattern.

As an option, some of the devices 2200 may comprise neutron-sensitive gamma-blind detector material so as to map the neutron background distribution, while others may be neutron-blind gamma-sensitive, so that both types of radiation can be mapped at the same time. In addition, some of the devices 2200 may be configured to detect low energy gamma rays while others detect high-energy gammas, and likewise some of the devices 2200 may be configured to detect only low energy neutrons or only high energy neutrons. Most naturally-occurring background neutrons have low energy, due to multiple scattering in the atmosphere, whereas neutrons from weapon materials are generally high energy of about 1 MeV to a few MeV. Detecting even a few high energy neutrons coming from the same location may be suspicious.

Figure 23:
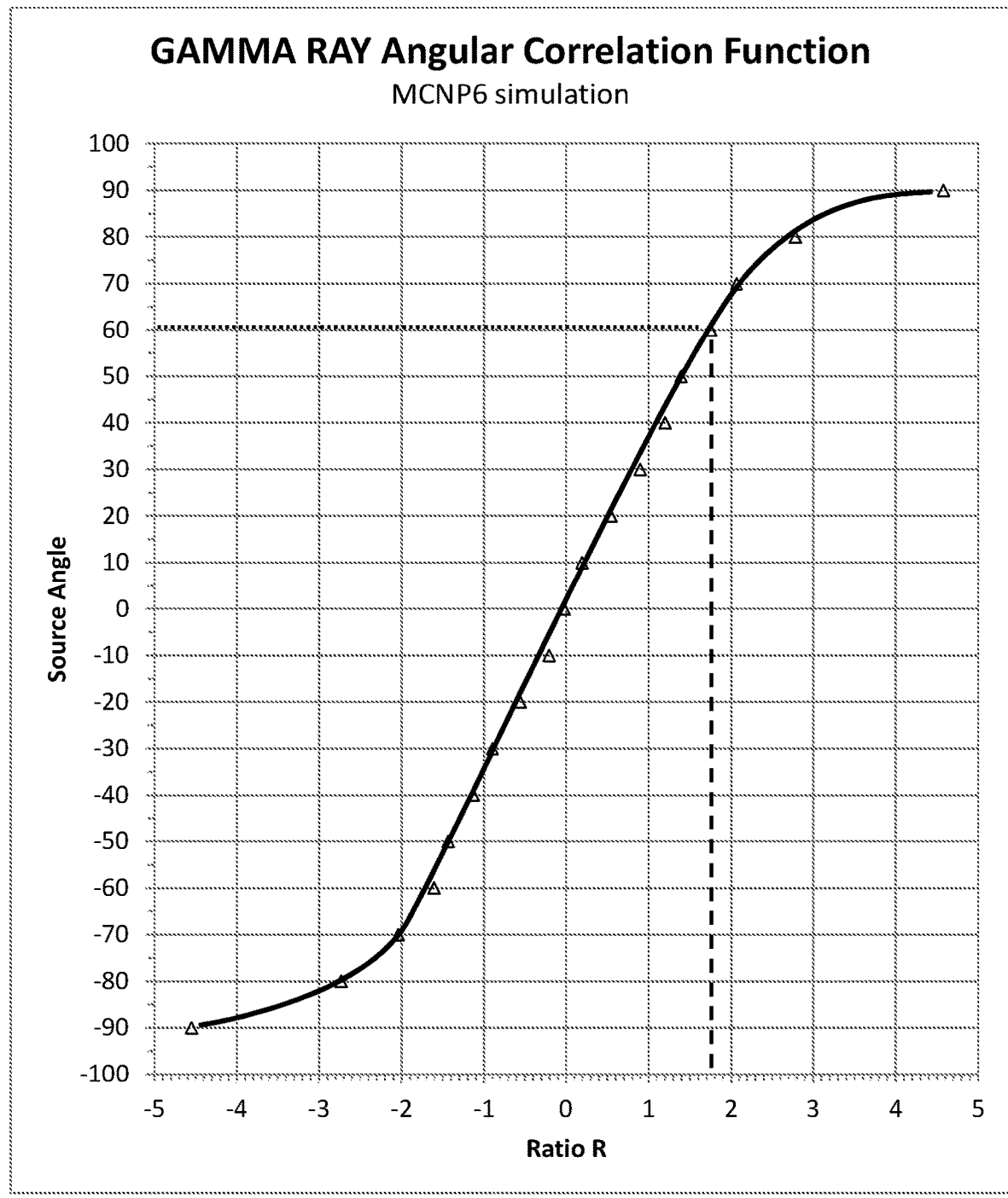
FIG. 23 is a graph from an MCNP6 gamma ray simulation showing the angular correlation function that relates the source angle to the counting rate ratio, according to some embodiments.

FIG. 23 is a graph showing the results of a simulation using the MCNP6 software, in which simulated gamma rays from a source were detected in a simulated device according to the present disclosure. The graph shows the angular correlation function that relates the detection ratio R to the source angle, determined from the simulation results. The simulation used a configuration such as that of FIG. 1, with 50 mm thick CsI side detectors and a 10 mm thick $CdWO_4$ front detector. The simulated source was a 1.0 MeV isotropic gamma source. The aiming plane was pointed at zero degrees in the simulation and the source was moved around the device from −90 to +90 degrees. The graph shows the angular correlation between the source angle and the ratio R=D/F where D is the differential between the two side detector counting rates and F is the front detector counting rate. The angular sensitivities of the front and side detectors were sufficiently different that an angular correlation function as shown can determine the source angle, both sign and magnitude, from the detector rates alone.

To use the angular correlation function, the particle detection rates may first be acquired for all the detectors, and the differential D may be found by subtracting the counting rate of the first side detector from the second side detector. Then that differential may be divided by the front detector rate, thereby obtaining the ratio R. Then the source angle can be determined by finding the point on the curve that corresponds to the calculated value of R, and reading across to the vertical axis which shows the angle that corresponds to the calculated value of R. The correlation is monotonic, meaning that a unique source angle can be found for each value of R. The correlation exhibits reduced slope at high source angles above about 70 degrees, which is beneficial because the source angle can be determined with very high precision at high angles, even with few counts detected, due to that curve shape. This is in direct contrast to directional detectors that lack a front detector, which invariably exhibit a near-vertical slope at high angles, and which therefore provide no angular information at all when the source is at high angles. Using the angular correlation function shown in the figure, the device can provide a precise determination of the source angle throughout the front half-space, and particularly at high source angles where systems that lack a front counter have the worst performance.

To consider a specific example, in a particular simulation run the data obtained for the various detectors resulted in a ratio R of 1.75, which is indicated by the dashed vertical line. The angular correlation function then implies that the corresponding source angle is about 61 degrees as indicated by the dotted horizontal line. This result is close to the actual value of 60 degrees which was used in the simulation. The results shown in the graph demonstrate that the source angle can be determined within 1 degree throughout the range of −90 to +90 degrees. Furthermore, with the addition of a back counter, the source angle can be determined with equal precision throughout the entire 360-degree range.

Optionally, and equivalently, the reverse correlation function can be used instead, by reversing the horizontal and vertical axes of the chart and reading the angle from the horizontal axis corresponding to the value of R on the vertical axis. As a further option, the inverse of R (that is, the front detector rate divided by the differential) can be used to calculate the source angle; however the inverse of R becomes problematic at source side angles near zero when the detection rates of the two side detectors are nearly equal.

Figure 24:
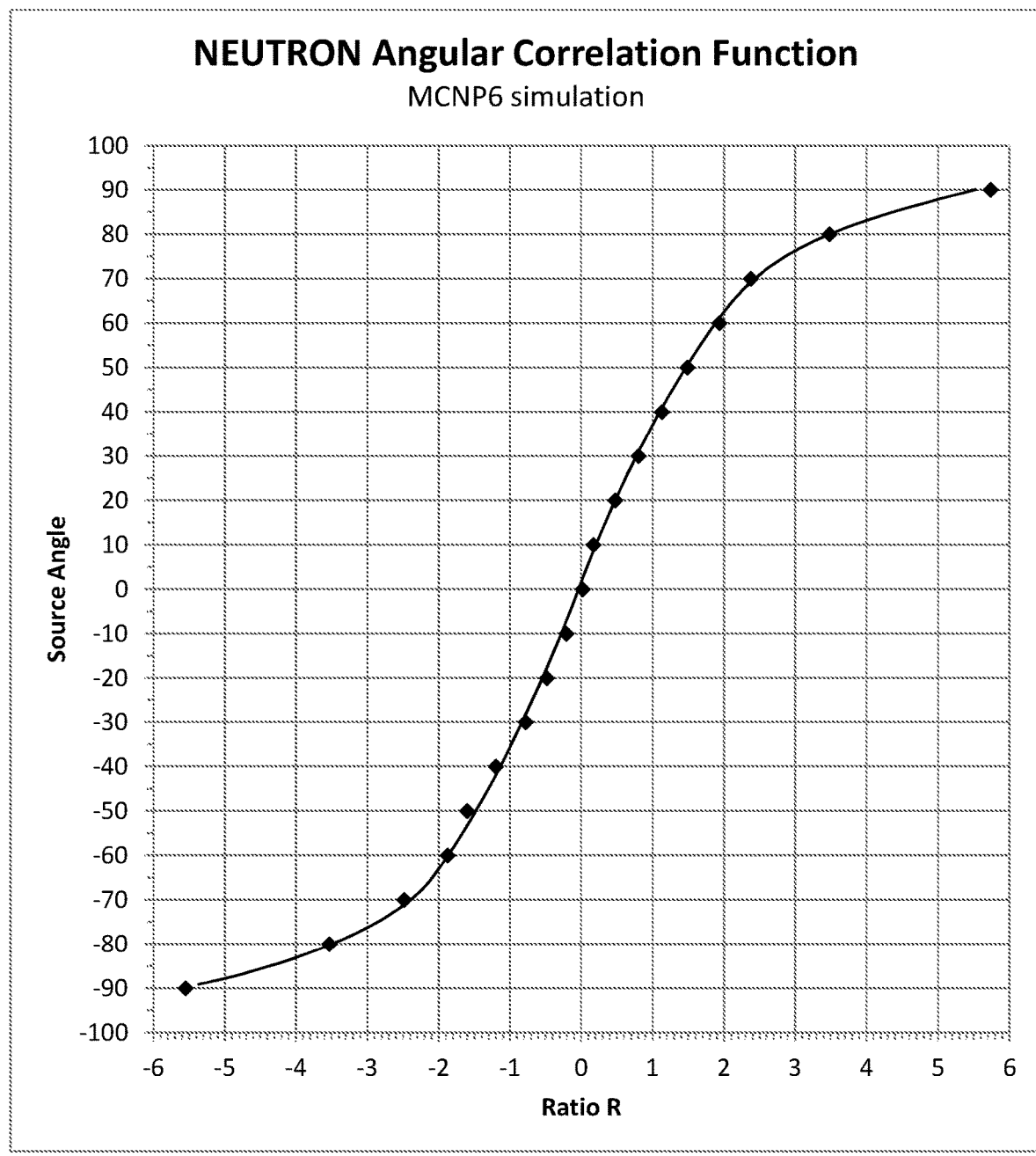
FIG. 24 is a graph from an MCNP6 neutron simulation showing the angular correlation function that relates the source angle to the counting rate ratio, according to some embodiments.

FIG. 24 is a graph showing the results of a neutron detection simulation using MCNP6, similar to the gamma ray simulation of FIG. 23, but now with detectors of PMMA with boron-loaded microbead scintillator, detecting 1 MeV neutrons from an isotropic source. The angular correlation function for neutrons is similar in overall appearance to the gamma ray correlation function, but differs in specific values. It again provides precise angular resolution for neutron source angles as high as 90 degrees, and about 1 degree angular resolution throughout the −90 to +90 degree range. The gamma ray and neutron simulation charts show that the source angle can be determined from detector data at a single orientation of the device, using either gamma rays or neutrons.

Figure 25:
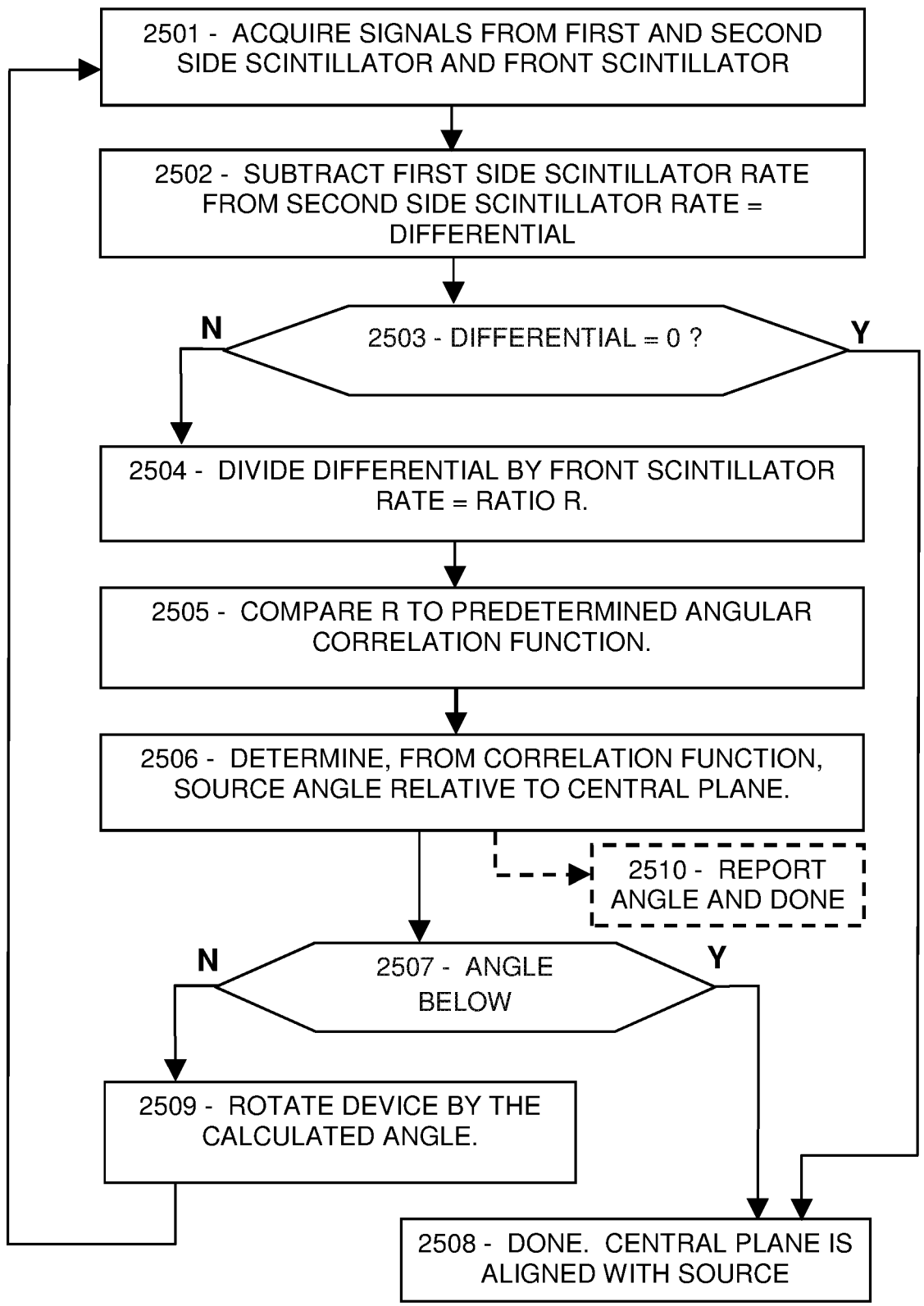
FIG. 25 is a flowchart showing steps of an exemplary method for calculating the source angle and rotating the device to verify, according to some embodiments.

FIG. 25 is a flowchart showing the steps of an exemplary method for determining the source angle and optionally for rotating the device until it is in alignment with the source. First (2501) the side detector particle detection rates and the front detector particle detection rates may be measured with the device at an arbitrary initial orientation. Then, (2502) the rates for one side detector may be subtracted from the other side detector, thereby obtaining a differential. Then, (2503) the differential may be checked to see if it is close to zero, or within some limit of zero. If so, then the task is complete (2508) and the aiming plane is aligned with the source. If the aiming plane is not yet aligned with the source, the ratio R may be calculated (2504) by dividing the differential by the front detector rate. R may then be compared (2505) to a predetermined angular correlation function, and the source angle may be determined (2506) as the particular angle that matches the predetermined angular correlation function at the ratio R.

In some applications, it is sufficient to localize the source, and there is no need to aim the device at the source location. In that case (2510, shown in dash), the angle may be displayed or transmitted or otherwise reported, and the method terminates.

In other applications, the device is required to finally point directly at the source. In that case (2507) the calculated source angle may be compared to a threshold, such as one degree. If the source angle, as calculated from the counting rate data, is below the threshold, the device is satisfactorily aligned with the source, and the method terminates (2508).

If the calculated source angle is not below that threshold, then the device may be rotated (2509) according to the calculated angle, and the rates may again be acquired (2501) and the alignment criteria again tested. In most embodiments, a single rotation is sufficient to align the device with the source.

Figure 26:
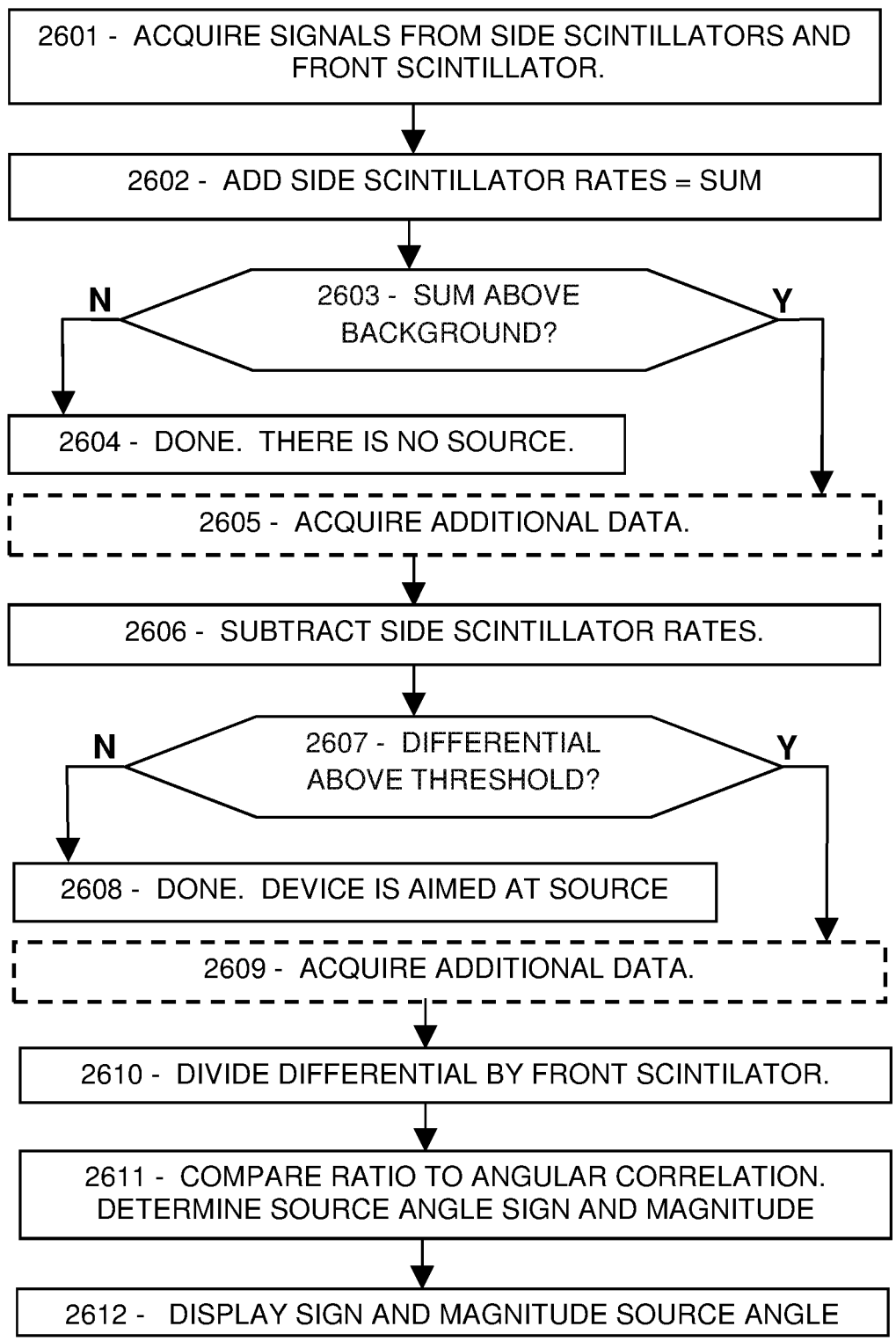
FIG. 26 is a flowchart showing steps of an exemplary staged analysis method to optimize the use of low detection rates, according to some embodiments.

FIG. 26 is a flowchart showing an exemplary method for determining the source angle in stages. First (2601) signals may be acquired and counting rates may be calculated for the side detectors and the front detector during a first integration time. The side detector rates may be added (2602) and the sum may be compared to a predetermined background rate (2603). If the summed signals are not significantly above background levels (2604), the device may indicate that no source is present, or at least no source is yet detected. But if the sum of the side detector rates is above the normal backgrounds, then the source is detected but not yet localized. Additional data may then be acquired (2605) for the angle calculation. For example, if the sum is just barely above background, it may be necessary to acquire additional data during a second integration time to enable a reliable angular analysis.

Then, after acquiring additional data, the differential may be calculated (2606) by subtracting one of the side detector rates from the other, and the differential may be compared (2607) to a predetermined threshold. If the differential is below the threshold, this indicates that the aiming plane is sufficiently aligned with the source, and the task is done (2608). If the differential is not zero, or is not below a predetermined threshold, then additional detector data may then be acquired (2609) in a third integration time if needed for determining the magnitude of the angle. The decision as to whether this third acquisition is needed may depend on the number of counts in the front detector. For example, additional data may be required if the front detector counting rate (minus background) is comparable to its statistical uncertainty.

Then, the source angle may be calculated by dividing the differential by the front detector rate (2610) and comparing the ratio to the predetermined angular correlation function (2611). The source location or source angle may then be reported (2612) by displaying it on a screen, or transmitting it to a facility computer, or storing it in non-transient media, or otherwise responding according to the application needs.

Optionally, a fourth acquisition may be carried out to acquire more statistics and reduce the angular uncertainty in the result. If a source is present, it is usually worth taking extra data to obtain the best value possible.

Optionally, after the device has been rotated to the predicted source location, fresh detection data may be acquired there. The sequential steps shown in the chart may then be repeated, but now with the aiming plane substantially aligned with the source, such that the differential is nearly zero and the computed source angle is nearly zero, thereby confirming the alignment.

Embodiments of the device disclosed herein can provide many advantages over conventional detectors. (a) Embodiments of the device can determine the full sign and magnitude of the angle between the aiming plane and the source, across the entire range of −90 to +90 degrees, and (b) can do so in a single acquisition interval at a single device orientation. (c) With addition of a back detector, embodiments can determine the source angle precisely throughout the full 360-degree circle. (d) By selection of appropriate detector materials, embodiments can detect gamma rays or neutrons or both simultaneously. (e) When rotated according to the calculated source angle, embodiments can converge on the source location in only one step usually. (f) Embodiments can achieve high detection efficiency because the detectors have a direct view of the source particles regardless of the orientation of the device, unobstructed by collimators or shields. (g) Embodiments of the device are compact, low-cost, easy to implement in an inspection environment, suitable for a variety of important security scanning applications, and virtually immune to defeat by shielding or obfuscation.

As a result of these and other advantages, the device disclosed herein can provide greatly improved inspection applications including vehicle and cargo inspection, personnel portals, portable survey meters, mobile scanners searching for radiation in the environment, and many other critical applications. Advanced radiation detection systems like those disclosed herein will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

What is claimed is:

1. A device for determining a direction toward a radioactive source, comprising:
    two side detectors positioned on opposite sides of an aiming plane that extends from the back to the front of the device, each side detector configured to emit a signal upon detecting a particle from the radioactive source;
    a front detector comprising a slab positioned frontward of the side detectors, oriented perpendicular to the aiming plane, and configured to emit a signal upon detecting a particle from the radioactive source; and
    a processor communicatively coupled to the side detectors and the front detector, configured to determine, at least in part based on signals associated with the side detectors and signals associated with the front detector, the sign and magnitude of an angle between the aiming plane and the radioactive source.

2. The device of claim 1, further including non-transient computer-readable media configured to cause the processor to perform a method comprising:
    measuring particle detection data of each side detector and of the front detector respectively, the particle detection data comprising a number of detection events, or a detection rate, or an electrical current, or a voltage, or a charge;
    subtracting the particle detection data of one of the side detectors from the particle detection data of the other side detector, thereby obtaining a differential;
    dividing the differential by the particle detection data of the front detector, thereby obtaining a ratio; and
    comparing the ratio, or a function of the ratio, to a predetermined angular correlation function that relates the particle detection data to the angle between the aiming plane and the radioactive source.

3. The device of claim 2, wherein the device includes no shields or collimators.

4. The device of claim 1, wherein the processor is further configured to determine whether the radioactive source is in front or behind the device.

5. The device of claim 1, further including a light sensor configured to view the front detector and both side detectors simultaneously.

6. The device of claim 1, wherein the processor is configured to determine the energy of a particle by adding an energy deposited in one of the side detectors plus an energy deposited in the other side detector.

7. The device of claim 1, wherein the processor is configured to determine the energy of a particle by adding an energy deposited in one of the side detectors plus an energy deposited in the other side detector plus an energy deposited in the front detector.

8. The device of claim 1, wherein the front detector comprises a left front portion and a right front portion, wherein the left and right front portions are on opposite sides of the aiming plane.

9. The device of claim 8, wherein the processor is further configured to calculate a front detection rate by adding detection data of the left front portion plus detection data of the right front portion.

10. The device of claim 8, wherein the left front portion is optically coupled to one of the side detectors and the right front portion is optically coupled to the other side detector.

11. The device of claim 1, further including a back detector positioned behind the side detectors and configured to emit a signal upon detecting a particle from the radioactive source.

12. The device of claim 11, wherein the back detector comprises a left back portion and a right back portion, wherein the left and right back portions are on opposite sides of the aiming plane.

13. The device of claim 1, wherein the front detector is divided into an upper front detector and a lower front detector which abut at a midplane that is perpendicular to the aiming plane, and wherein the processor is configured to determine whether the radioactive source is above or below the midplane by comparing detection data of the upper front detector with detection data of the lower front detector.

14. A device for determining a direction toward a radioactive source, comprising:
three detectors, each detector configured to emit signals upon detecting particles from the radioactive source; and
a processor configured to determine the direction toward the radioactive source by analyzing the signals; wherein
a first detector and a second detector, of the three detectors, are positioned on opposite sides of an aiming plane that passes centrally from back to front of the device; and
a third detector, of the three detectors, is slab-shaped, positioned frontward of the first and second detectors, and oriented perpendicular to the aiming plane.

15. The device of claim 14, wherein the processor is configured to compare a function of the signals to a predetermined angular correlation function that relates the signals to the direction toward the radioactive source.

16. The device of claim 15, wherein the function of the signals comprises a ratio comprising a difference between detection data of the first detector and detection data of the second detector, said difference divided by detection data of the third detector.

17. The device of claim 14, wherein the processor is configured to determine both a sign and a magnitude of an angle between the aiming plane and the direction toward the radioactive source.

18. A method for determining a direction toward a radioactive source comprising:
measuring particle detection data in a first detector, a second detector, and a third detector respectively, the first and second detectors being positioned on opposite sides of an aiming plane, and the third detector being slab-shaped and oriented perpendicular to the aiming plane;
subtracting the particle detection data of the first detector from the particle detection data of the second detector, thereby obtaining a difference;
dividing the difference by the particle detection data of the third detector, or dividing the particle detection data of the third detector by the difference, thereby obtaining a ratio;
comparing the ratio to a predetermined angular correlation function configured to relate the ratio to an angle between the aiming plane and the direction toward the radioactive source.

19. The method of claim 18, wherein the particle detection data comprises a number of detection events, a rate of detection events, a voltage, a current, or a charge.

20. The method of claim 18, further comprising measuring particle detection data in a fourth detector, wherein the fourth detector is slab-shaped, positioned behind the side detectors, and oriented perpendicular to the aiming plane.

* * * * *